United States Patent
Moore et al.

(10) Patent No.: US 8,418,759 B2
(45) Date of Patent: Apr. 16, 2013

(54) FLUORINATED POLYMER COMPOSITIONS AND METHODS FOR TREATING HYDROCARBON-BEARING FORMATIONS USING THE SAME

(75) Inventors: George G. I. Moore, Afton, MN (US); Rudolf J. Dams, Antwerp (BE); Jimmie R. Baran, Jr., Prescott, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 411 days.

(21) Appl. No.: 12/809,794

(22) PCT Filed: Dec. 18, 2008

(86) PCT No.: PCT/US2008/087403
§ 371 (c)(1), (2), (4) Date: Jun. 21, 2010

(87) PCT Pub. No.: WO2009/085936
PCT Pub. Date: Jul. 9, 2009

(65) Prior Publication Data
US 2010/0288498 A1    Nov. 18, 2010

Related U.S. Application Data

(60) Provisional application No. 61/016,225, filed on Dec. 21, 2007.

(51) Int. Cl.
*C09K 8/68* (2006.01)
*C09K 8/80* (2006.01)
*C09K 8/88* (2006.01)
*E21B 43/22* (2006.01)
*E21B 43/25* (2006.01)
*E21B 43/267* (2006.01)

(52) U.S. Cl.
USPC ............ 166/263; 166/280.1; 166/280.2; 166/305.1; 166/308.2; 428/407; 507/205; 507/219; 507/266; 507/268; 507/924; 528/391

(58) Field of Classification Search ............ None
See application file for complete search history.

(56) References Cited

U.S. PATENT DOCUMENTS
3,278,352 A   10/1966   Erickson
3,311,167 A    3/1967   O'Brien
(Continued)

FOREIGN PATENT DOCUMENTS
EP   0331307   9/1989
EP   1788061   5/2007
(Continued)

OTHER PUBLICATIONS

Adibhatla, "Effect of Surfactants on Wettability of Near-wellbore Regions of Gas Reservoirs", Journal of Petroleum Science and Engineering, 2006, vol. 52, pp. 227-236. (XP002519991).
(Continued)

*Primary Examiner* — George Suchfield

(57) ABSTRACT

Fluorinated polymers having first divalent units represented by formula, and a plurality of groups of formula —$CH_2$—$CH_2$—O—. Compositions containing the fluorinated polymer and solvent, and methods of treating hydrocarbon-bearing formations using these compositions are disclosed. A method of making a composition containing the fluorinated polymer is also disclosed.

20 Claims, 2 Drawing Sheets

U.S. PATENT DOCUMENTS

| | | | |
|---|---|---|---|
| 3,335,163 A * | 8/1967 | Tesoro et al. | 558/34 |
| 3,394,758 A | 7/1968 | Terry | |
| 3,406,004 A * | 10/1968 | Tesoro et al. | 8/115.56 |
| 3,553,179 A | 1/1971 | Bartlett | |
| 3,653,442 A | 4/1972 | Ross | |
| 3,902,557 A | 9/1975 | Shaughnessy | |
| 4,018,689 A | 4/1977 | Thompson | |
| 4,200,154 A | 4/1980 | Tate | |
| 4,329,236 A | 5/1982 | Alford | |
| 4,399,077 A | 8/1983 | Vanlerberghe | |
| 4,432,882 A | 2/1984 | Raynolds et al. | |
| 4,440,653 A | 4/1984 | Briscoe et al. | |
| 4,460,791 A | 7/1984 | Cooke | |
| 4,533,713 A | 8/1985 | Howells | |
| 4,557,837 A | 12/1985 | Clark, III | |
| 4,563,493 A | 1/1986 | Fukui | |
| 4,565,639 A | 1/1986 | Penny | |
| 4,584,196 A | 4/1986 | Vanlerberghe | |
| 4,594,200 A | 6/1986 | Penny | |
| 4,609,477 A | 9/1986 | Crema | |
| 4,681,974 A | 7/1987 | Hisamoto | |
| 4,702,849 A | 10/1987 | Penny | |
| 4,753,740 A | 6/1988 | Marlett et al. | |
| 4,767,545 A | 8/1988 | Karydas et al. | |
| 4,817,715 A | 4/1989 | Peru | |
| 4,823,873 A | 4/1989 | Karydas | |
| 4,921,619 A | 5/1990 | Karydas | |
| 4,923,009 A | 5/1990 | Watkins | |
| 4,993,448 A | 2/1991 | Karydas et al. | |
| 4,997,580 A | 3/1991 | Karydas et al. | |
| 5,042,580 A | 8/1991 | Cullick | |
| 5,092,405 A | 3/1992 | Prukop | |
| 5,129,457 A | 7/1992 | Sydansk | |
| 5,186,257 A | 2/1993 | Stahl et al. | |
| 5,247,993 A | 9/1993 | Sarem et al. | |
| 5,310,002 A | 5/1994 | Blauch et al. | |
| 5,358,052 A | 10/1994 | Gidley | |
| 6,165,948 A | 12/2000 | Dewenter et al. | |
| 6,182,759 B1 | 2/2001 | Burger | |
| 6,206,102 B1 | 3/2001 | Pusch | |
| 6,225,263 B1 | 5/2001 | Collins | |
| 6,313,335 B1 | 11/2001 | Roberts | |
| 6,365,769 B1 | 4/2002 | Behr | |
| 6,485,789 B1 | 11/2002 | Allewaert | |
| 6,579,572 B2 | 6/2003 | Espin | |
| 6,660,693 B2 | 12/2003 | Miller | |
| 6,664,354 B2 | 12/2003 | Savu | |
| 6,689,854 B2 | 2/2004 | Fan et al. | |
| 6,729,409 B1 | 5/2004 | Gupta et al. | |
| 6,911,417 B2 | 6/2005 | Chan | |
| 6,945,327 B2 | 9/2005 | Ely | |
| 6,972,274 B1 | 12/2005 | Slikta et al. | |
| 7,084,094 B2 | 8/2006 | Gunn et al. | |
| 7,165,613 B2 | 1/2007 | Chan et al. | |
| 7,417,099 B2 | 8/2008 | Savu et al. | |
| 7,585,817 B2 | 9/2009 | Pope | |
| 7,629,298 B2 | 12/2009 | Arco et al. | |
| 7,772,162 B2 | 8/2010 | Pope et al. | |
| 7,855,169 B2 | 12/2010 | Pope et al. | |
| 8,043,998 B2 | 10/2011 | Pope et al. | |
| 8,138,127 B2 | 3/2012 | Pope et al. | |
| 8,176,981 B2 | 5/2012 | Savu | |
| 8,236,737 B2 | 8/2012 | Fan | |
| 8,261,825 B2 | 9/2012 | Pope et al. | |
| 2003/0092581 A1 | 5/2003 | Crews | |
| 2003/0139549 A1 | 7/2003 | Savu | |
| 2005/0244641 A1 | 11/2005 | Vincent | |
| 2006/0045979 A1 | 3/2006 | Dams | |
| 2006/0264334 A1 | 11/2006 | Gupta et al. | |
| 2007/0015669 A1 | 1/2007 | Zhang | |
| 2007/0029085 A1 | 2/2007 | Panga | |
| 2007/0049646 A1 | 3/2007 | Moore | |
| 2007/0123430 A1 | 5/2007 | Pasquier | |
| 2007/0225176 A1 | 9/2007 | Pope | |
| 2010/0152071 A1 | 6/2010 | Pope | |
| 2010/0181068 A1 | 7/2010 | Pope | |
| 2010/0224361 A1 | 9/2010 | Pope | |
| 2010/0270019 A1 | 10/2010 | Pope | |
| 2010/0270020 A1 | 10/2010 | Baran, Jr. | |
| 2010/0270021 A1 | 10/2010 | Baran, Jr. | |
| 2010/0276142 A1 | 11/2010 | Skildum | |
| 2010/0276149 A1 | 11/2010 | Pope | |
| 2011/0056689 A1 | 3/2011 | Baran, Jr. | |
| 2011/0124532 A1 | 5/2011 | Maurer | |
| 2011/0136704 A1 | 6/2011 | Sharma | |
| 2011/0177983 A1 | 7/2011 | Baran, Jr. | |
| 2011/0201531 A1 | 8/2011 | Sharma | |
| 2011/0247822 A1 | 10/2011 | Dams | |
| 2011/0247823 A1 | 10/2011 | Dams | |
| 2012/0097393 A1 | 4/2012 | Dams | |

FOREIGN PATENT DOCUMENTS

| | | |
|---|---|---|
| GB | 2031482 | 4/1980 |
| JP | 57-72977 | 5/1982 |
| SU | 1706204 | 11/1994 |
| WO | WO 98/51726 | 11/1998 |
| WO | WO 03/089540 | 10/2003 |
| WO | WO 2005/028589 A1 | 3/2005 |
| WO | WO 2005/035936 A1 | 4/2005 |
| WO | WO 2007/017806 | 2/2007 |
| WO | WO 2007/003489 | 3/2007 |
| WO | WO 2007/097975 | 8/2007 |

OTHER PUBLICATIONS

Al-Anazi et al., "A Successful Methanol Treatment in a Gas-Condensate Reservoir: Field Application", Mar. 2003, SPE 80901, Society of Petroleum Engineers Inc., pp. 1-9.

Clark, H. B., et al., "Use of Fluorochemical Surfactants in Nonaqueous Stimulation Fields," *Journal of Petroleum Chemistry* vol. 32, No. 10 (1980) p. 1695-1697.

Crema et al., "Foaming of Anhydrous Methanol for Well Stimulation", Apr. 1985, SPE 13565, Society of Petroleum Engineers Inc., 4 pages.

Fahes, "Wettability Alteration to Intermediate Gas-Wetting in Gas-Condensate Reservoirs at High Temperatures", Oct. 9-12, 2005, SPE Annual Technical Conference and Exhibition, Dallas, TX, pp. 1-14. SPE 96184.

Kumar, "Improving the Gas and Condensate Relative Permeability Using Chemical Treatments", May 15-17, 2006, SPE Gas Technology Symposium, Calgary, Alberta, pp. 1-9. SPE 100529.

Li, K. et al., "Experimental Study of Wettability Alteration to Preferential Gas-Wetting in Porous Media and Its Effects", SPE Reservoir Eval. and Eng 3 (2), pp. 139-149.

McLeod, "The Use of Alcohol in Gas Well Stimulation", Nov. 10-11, 1966, SPE Eastern Regional Meeting, Columbus, Ohio, pp. 1-13. SPE 1663.

Noh et al., "Experimental Study of Wettability Alteration for Reservoir Rock", Project 3—Gas Condensate Reservoirs Part 2, Reservoir Engineering Research Institute, Apr. 1-Jun. 30, 2005.

Noh et al., "Effect of Wettability on High-Velocity Coefficient in Two-Phase Gas-Liquid Flow", SPE 102773, 2006 SPE Annual Technical Conference and Exhibition held in San Antonio, TX, Sep. 24-27, 2006.

Panga, "Preventive Treatment for Enhancing Water Removal from Gas Reservoirs by Wettability Alteration", Mar. 11-14, 2007, 15th SPE Middle East Oil & Gas Show and Conference, Kingdom of Bahrain, pp. 1-12. SPE 105367.

Tang, "Relative Permeability Modification in Gas/Liquid Systems Through Wettability Alteration to Intermediate Gas Wetting", SPE Reservoir Evaluation and Engineering, Dec. 2002, vol. 5, No. 6, pp. 427-436. SPE 81195.

International Search Report for PCT/US2008/087403, 3 pgs.

Written Opinion of the ISA for International Application No. PCT/US2008/087403, 6 pgs.

* cited by examiner

FLUORINATED POLYMER COMPOSITIONS AND METHODS FOR TREATING HYDROCARBON-BEARING FORMATIONS USING THE SAME

CROSS REFERENCE TO RELATED APPLICATIONS

This application is a national stage filing under 35 U.S.C. 371 of PCT/US2008/087403, filed Dec. 18, 2008, which claims priority to U.S. Provisional Application No. 61/016,225, filed Dec. 21, 2007, the disclosure of which is incorporated by reference in its entirety herein.

BACKGROUND

In the oil and gas industry, certain surfactants (including certain fluorinated surfactants) are known as fluid additives for various downhole operations (e.g., fracturing, waterflooding, and drilling). Often, these surfactants function to decrease the surface tension of the fluid or to stabilize foamed fluids.

Some hydrocarbon and fluorochemical compounds have been used to modify the wettability of reservoir rock, which may be useful, for example, to prevent or remedy water blocking (e.g., in oil or gas wells) or liquid hydrocarbon accumulation (e.g., in gas wells) in the vicinity of the wellbore (i.e., the near wellbore region). Water blocking and liquid hydrocarbon accumulation may result from natural phenomena (e.g., water-bearing geological zones or condensate banking) and/or operations conducted on the well (e.g., using aqueous or hydrocarbon fluids). Water blocking and condensate banking in the near wellbore region of a hydrocarbon-bearing geological formation can inhibit or stop production of hydrocarbons from the well and hence are typically not desirable. Not all hydrocarbon and fluorochemical compounds, however, provide the desired wettability modification.

Solvent injection (e.g., injection of methanol) has been used to alleviate the problems of water blocking and condensate banking in gas wells, but this method may provide only a temporary benefit, and may not be desirable under some downhole conditions.

SUMMARY

In one aspect, the present disclosure provides a fluorinated polymer comprising:
first divalent units represented by formula:

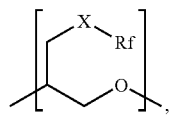

and
a plurality of groups of formula —$CH_2$—$CH_2$—O—,
wherein
each Rf independently represents a fluoroalkyl group having from 1 to 4 carbon atoms;
each X is independently —N(R)$SO_2$—, —N(R)CO—, —O—$C_pH_{2p}$—, or —S—$C_pH_{2p}$—;
p is an integer from 0 to 6; and
R is hydrogen or alkyl having 1 to 6 carbon atoms.

In another aspect, the present disclosure provides a composition comprising a fluorinated polymer and solvent, wherein the fluorinated polymer comprises:
first divalent units represented by formula:

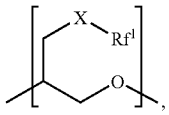

and
a plurality of groups of formula —$CH_2$—$CH_2$—O—,
wherein
each X is independently —N(R)$SO_2$—, —N(R)CO—, —O—$C_pH_{2p}$—, or —S—$C_pH_{2p}$—;
R hydrogen or alkyl having 1 to 6 carbon atoms;
p is an integer from 1 to 6; and
each $Rf^1$ independently represents a fluoroalkyl group having from 1 to 8 carbon atoms;
and wherein the solvent comprises:
at least one of a polyol or polyol ether, each independently having from 2 to 25 carbon atoms, and
at least one monohydroxy alcohol, ether, or ketone, each independently having up to 4 carbon atoms.

In another aspect, the present disclosure provides a method of treating a hydrocarbon-bearing formation, the method comprising:
contacting the hydrocarbon-bearing formation with a composition, the composition comprising solvent and a fluorinated polymer, the fluorinated polymer comprising:
first divalent units represented by formula:

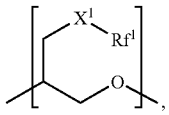

and
a plurality of groups of formula —$CH_2$—$CH_2$—O—,
wherein
each $X^1$ is independently —N(R)$SO_2$—, —N(R)CO—, —O—$C_pH_{2p}$—, —S—$C_pH_{2p}$—, or —$C_qH_{2q}$—;
R is hydrogen or alkyl having 1 to 6 carbon atoms;
p is an integer from 0 to 6;
q is an integer from 0 to 6; and
each $Rf^1$ independently represents a fluoroalkyl group having from 1 to 8 carbon atoms.

In some embodiments of the foregoing method, the hydrocarbon-bearing formation is penetrated by a wellbore, wherein a region near the wellbore is contacted with the composition. In some of these embodiments, the method further comprises obtaining hydrocarbons from the wellbore after contacting the hydrocarbon-bearing formation with the composition.

In another aspect, the present disclosure provides a hydrocarbon-bearing siliciclastic formation treated with a fluorinated polymer, wherein the fluorinated polymer comprises:

first divalent units represented by formula:

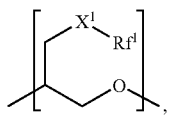

and
a plurality of groups of formula —CH$_2$—CH$_2$—O—,
wherein
each X$^1$ is independently —N(R)SO$_2$—, —N(R)CO—, —O—C$_p$H$_{2p}$—, —S—C$_p$H$_{2p}$—, or —C$_q$H$_{2q}$—;
R is hydrogen or alkyl having 1 to 6 carbon atoms;
p is an integer from 0 to 6;
q is an integer from 0 to 6; and
each Rf$^1$ independently represents a fluoroalkyl group having from 1 to 8 carbon atoms. In some embodiments, the formation is downhole. In some embodiments, the fluorinated polymer is adsorbed on the formation. In some embodiments, X$^1$ is —N(R)SO$_2$—, R is methyl or ethyl, and Rf$^1$ represents a fluoroalkyl group having from 1 to 4 carbon atoms.

In another aspect, the present disclosure provides a method of making a composition, the method comprising:
selecting a geological zone of a hydrocarbon-bearing formation, the geological zone having a temperature, a hydrocarbon composition, and a brine composition;
receiving data comprising the temperature and at least one of the hydrocarbon composition or the brine composition of the geological zone of the formation;
generating a formulation comprising a fluorinated polymer and solvent, wherein the fluorinated polymer comprises:
first divalent units represented by formula:

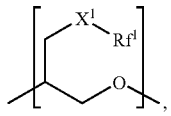

and
a plurality of groups of formula —CH$_2$—CH$_2$—O—,
wherein
each X$^1$ is independently —N(R)SO$_2$—, —N(R)CO—, —O—C$_p$H$_{2p}$—, —S—C$_p$H$_{2p}$—, or —C$_q$H$_{2q}$—;
R is hydrogen or alkyl having 1 to 6 carbon atoms;
p is an integer from 0 to 6;
q is an integer from 0 to 6; and
each Rf$^1$ independently represents a fluoroalkyl group having from 1 to 8 carbon atoms,
wherein the formulation is generated based at least in part on compatibility information concerning the fluorinated polymer, the solvent, the temperature, and at least one of the hydrocarbon composition or the brine composition of the geological zone of the formation; and
making the composition according to the formulation.

The methods of treating a hydrocarbon-bearing formation described herein may be used to increase the permeability in hydrocarbon-bearing formations wherein two phases (i.e., a gas phase and an oil phase) of the hydrocarbons are present, (e.g., in gas wells having retrograde condensate and oil wells having black oil or volatile oil). These methods are also typically useful for increasing the permeability in hydrocarbon-bearing formations having brine. Treatment of a near wellbore region of an oil and/or gas well that has at least one of brine or two phases of hydrocarbons in the near wellbore region using the methods disclosed herein may increase the productivity of the well. The term "productivity" as applied to a well refers to the capacity of a well to produce hydrocarbons (i.e., the ratio of the hydrocarbon flow rate to the pressure drop, where the pressure drop is the difference between the average reservoir pressure and the flowing bottom hole well pressure (i.e., flow per unit of driving force)). Although not wishing to be bound by theory, it is believed that the fluorinated polymers generally adsorb to hydrocarbon-bearing formations (e.g., siliciclastic formations) under downhole conditions and modify the wetting properties of the rock in the formation to facilitate the removal of hydrocarbons and/or brine. The fluorinated polymer may remain on the rock for the duration of an extraction of hydrocarbons from the formation (e.g., 1 week, 2 weeks, 1 month, or longer). Typically, and surprisingly, the fluorinated polymers disclosed herein improve the permeability of hydrocarbon-bearing formations to a greater extent than non-polymeric fluorochemicals that contain ethylene oxide groups.

Fluorinated polymers according to the present disclosure have been shown to be stable for an extended period of time under aqueous acidic and aqueous basic conditions, which demonstrates that they may be useful in a number of downhole environments.

In this application:
Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list.

The term "brine" refers to water having at least one dissolved electrolyte salt therein (e.g., sodium chloride, calcium chloride, strontium chloride, magnesium chloride, potassium chloride, ferric chloride, ferrous chloride, and hydrates thereof) at any nonzero concentration (in some embodiments, less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "hydrocarbon-bearing formation" includes both hydrocarbon-bearing formations in the field (i.e., subterranean hydrocarbon-bearing formations) and portions of such hydrocarbon-bearing formations (e.g., core samples).

"Alkyl group" and the prefix "alk-" are inclusive of both straight chain and branched chain groups and of cyclic groups. Unless otherwise specified, alkyl groups herein have up to 20 carbon atoms. Cyclic groups can be monocyclic or polycyclic and, in some embodiments, have from 3 to 10 ring carbon atoms.

The term "polymer" refers to a molecule having a structure which essentially includes the multiple repetition of units derived, actually or conceptually, from molecules of low relative molecular mass.

The term "fluoroalkyl group" includes linear, branched, and/or cyclic alkyl groups in which all C—H bonds are replaced by C—F bonds as well as groups in which hydrogen or chlorine atoms are present instead of fluorine atoms provided that up to one atom of either hydrogen or chlorine is present for every two carbon atoms. In some embodiments of fluoroalkyl groups, when at least one hydrogen or chlorine is present, the fluoroalkyl group includes at least one trifluoromethyl group.

All numerical ranges are inclusive of their endpoints unless otherwise stated.

BRIEF DESCRIPTION OF THE DRAWINGS

For a more complete understanding of the features and advantages of the present disclosure, reference is now made to the detailed description along with the accompanying figures and in which.

DETAILED DESCRIPTION

Figure 1:
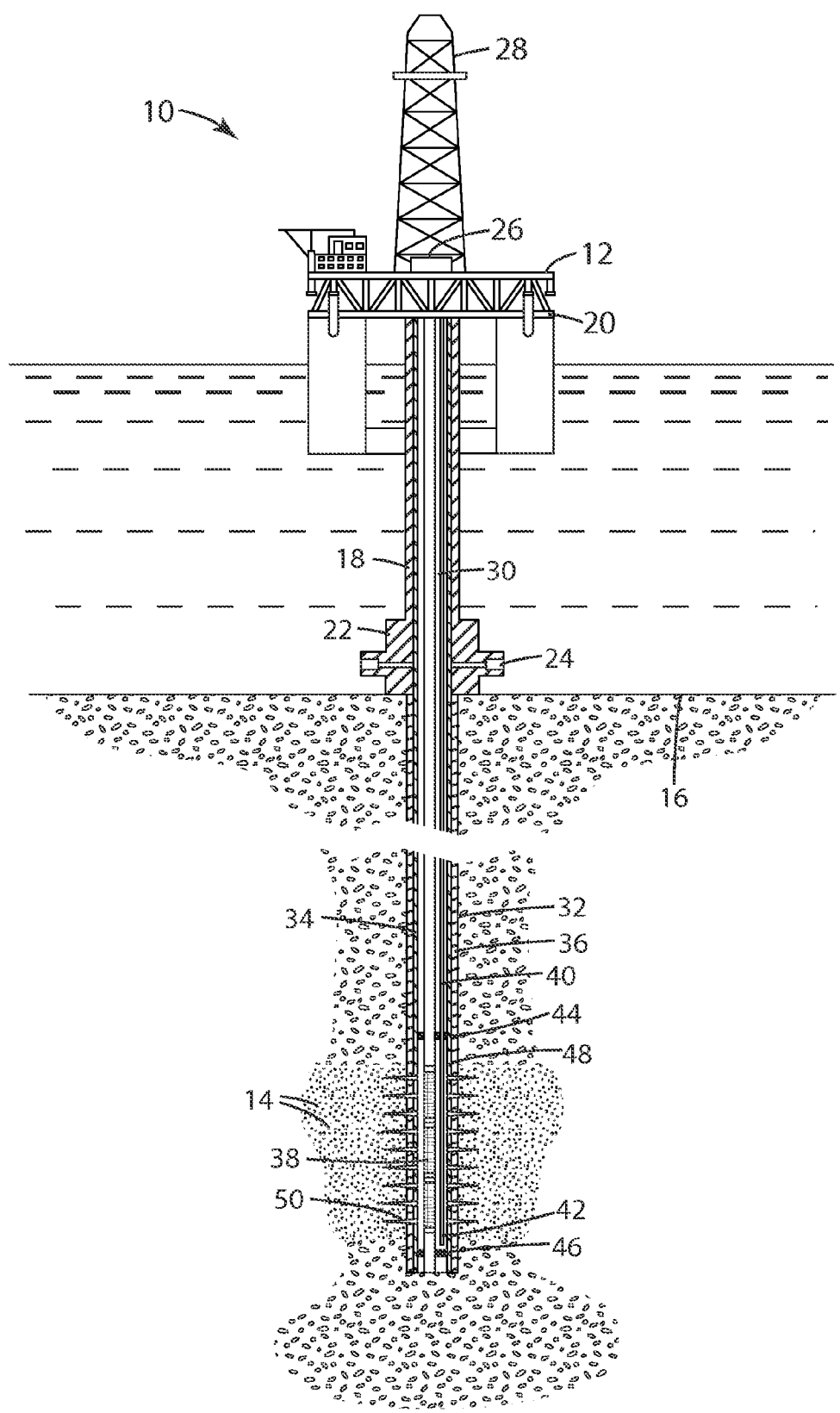
FIG. 1 is a schematic illustration of an exemplary embodiment of an offshore oil platform operating an apparatus for progressively treating a near wellbore region according to the present disclosure.

In some embodiments, fluorinated polymers according to the present disclosure comprise (e.g., at least 2, 3, 4, 5, 6, 7, 8, 9, or even at least 10 up to 15, 20, 25, 30, 35, 40, 45, 50 or even up to 100) first divalent units having formula:

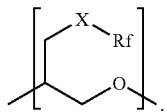

Each Rf independently represents a fluoroalkyl group having from 1 to 4 carbon atoms (e.g., trifluoromethyl, perfluoroethyl, 1,1,2,2-tetrafluoroethyl, 2-chlorotetrafluoroethyl, perfluoro-n-propyl, perfluoroisopropyl, perfluoro-n-butyl, 1,1,2,3,3,3-hexafluoropropyl, perfluoroisobutyl, perfluoro-sec-butyl, or perfluoro-tert-butyl). In some embodiments, Rf is perfluorobutyl (e.g., perfluoro-n-butyl, perfluoroisobutyl, or perfluoro-sec-butyl). In some embodiments, Rf is perfluoropropyl (e.g., perfluoro-n-propyl). In some embodiments, the fluoroalkyl group is represented by formula $-CF_2-CHF-CF_3$. In some embodiments, the fluoroalkyl group is represented by formula $-CF(CF_3)_2$. The fluoroalkyl group may also contain a mixture of fluorinated groups (e.g., with an average of up to 4 carbon atoms).

In some embodiments of compositions according to the present disclosure, the fluorinated polymer comprises (e.g., at least 2, 3, 4, 5, 6, 7, 8, 9, or even at least 10 up to 15, 20, 25, 30, 35, 40, 45, 50 or even up to 100) first divalent units having formula:

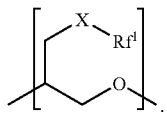

Each $Rf^1$ independently represents a fluoroalkyl group having from 1 to 8 carbon atoms (e.g., trifluoromethyl, perfluoroethyl, 1,1,2,2-tetrafluoroethyl, 2-chlorotetrafluoroethyl, perfluoro-n-propyl, perfluoroisopropyl, perfluoro-n-butyl, 1,1,2,3,3,3-hexafluoropropyl, perfluoroisobutyl, perfluoro-sec-butyl, or perfluoro-tert-butyl, perfluoro-n-pentyl, perfluoroisopentyl, perfluorohexyl, perfluoroheptyl, or perfluorooctyl). In some embodiments, $Rf^1$ is perfluorobutyl (e.g., perfluoro-n-butyl, perfluoroisobutyl, or perfluoro-sec-butyl). In some embodiments, $Rf^1$ is perfluoropropyl (e.g., perfluoro-n-propyl). In some embodiments, the fluorinated alkyl group is represented by formula $-CF_2-CHF-CF_3$. In some embodiments, the fluorinated alkyl group is represented by formula $-CF(CF_3)_2$. The fluoroalkyl group may also contain a mixture of fluorinated groups (e.g., with an average of up to 4 carbon atoms).

In any of the above embodiments of fluorinated polymers and compositions according to present disclosure, each X is independently $-N(R)SO_2-$, $-N(R)CO-$, $-O-C_pH_{2p}-$, or $-S-C_pH_{2p}-$, wherein p is an integer from 0 to 6 (i.e., 0, 1, 2, 3, 4, 5, or 6), and R is hydrogen or alkyl having 1 to 6 carbon atoms. In some embodiments, each X is independently $-N(R)SO_2-$ or $-N(R)CO-$. In some of these embodiments, R is alkyl having 1 to 4 carbon atoms (e.g., methyl or ethyl). In some embodiments, X is $-N(R)SO_2-$, and R is methyl or ethyl. In some embodiments, each X is independently $-O-C_pH_{2p}-$ or $-S-C_pH_{2p}-$. In some embodiments, X is $-O-C_pH_{2p}-$. In some of these embodiments, p is 1; in other of these embodiments, p is 2. In yet other of these embodiments, p is 0.

In some embodiments of treatment methods, treated formations, and methods of making composition according to the present disclosure, the fluorinated polymer comprises (e.g., at least 2, 3, 4, 5, 6, 7, 8, 9, or even at least 10 up to 15, 20, 25, 30, 35, 40, 45, 50 or even up to 100) first divalent units represented by formula:

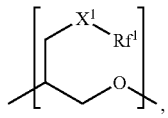

wherein $Rf^1$ is as defined above. Each $X^1$ is independently $-N(R)SO_2-$, $-N(R)CO-$, $-O-C_pH_{2p}-$, $-S-C_pH_{2p}-$, or $-C_qH_{2q}-$, wherein p is an integer from 0 to 6 (i.e., 0, 1, 2, 3, 4, 5, or 6), q is an integer from 0 to 6 (i.e., 0, 1, 2, 3, 4, 5, or 6), and R is hydrogen or alkyl having 1 to 6 carbon atoms. In some embodiments, each $X^1$ is independently $-N(R)SO_2-$ or $-N(R)CO-$. In some of these embodiments, R is alkyl having 1 to 4 carbon atoms (e.g., methyl or ethyl). In some embodiments, $X^1$ is $-N(R)SO_2-$, R is methyl or ethyl, and $Rf^1$ represents a fluoroalkyl group having from 1 to 4 carbon atoms. In some embodiments, each $X^1$ is independently $-O-C_pH_{2p}-$ or $-S-C_pH_{2p}-$. In some embodiments, $X^1$ is $-O-C_pH_{2p}-$. In some of these embodiments, p is 1; in other of these embodiments, p is 2.

Fluorinated polymers according to the present disclosure and/or useful in practicing the present disclosure comprise a plurality of groups having formula $-CH_2-CH_2-O-$, which may be present in a block of repeating ethylene oxide units. The block of repeating ethylene oxide units may have a number average molecular weight of at least 200, 300, 500, 700, or even at least 1000 grams per mole up to 2000, 4000, 5000, 8000, 10000, or even up to 15000 grams per mole. In some embodiments, at least a portion of the plurality of groups of formula $-CH_2-CH_2-O-$ are present in segments represented by formula:

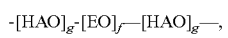

wherein

EO represents $-CH_2CH_2O-$;

each HAO independently represents $-CH(CH_3)CH_2O-$, $-CH_2CH(CH_3)O-$, $-CH(CH_2CH_3)CH_2O-$, $-CH_2CH(CH_2CH_3)O-$, or $-CH_2C(CH_3)_2O-$;

each f is independently an integer of from 1 to about 250 (e.g., 1 to 150, 1 to 100, 1 to 75, or 1 to 50); and each g is independently an integer of from 0 to about 55 (e.g., 0 to 45, 1 to 35, or 1 to 25). In some embodiments, each HAO independently represents —CH(CH$_3$)CH$_2$O— or —CH$_2$CH(CH$_3$)O—. In some embodiments, g is in a range of from 1 to 55 and the ratio f/g has a value of from at least 0.5, 0.75, 1 or 1.5 to 2.5, 2.7, 3, 4, 5, or more.

In some embodiments of hydrocarbon-bearing formations disclosed herein, the fluorinated polymer comprises a plurality of alkyleneoxy groups having from 2 to 4 (e.g., 2 to 3) carbon atoms. The plurality of alkyleneoxy groups can be a mixture of groups, for example, ethyleneoxy and propyleneoxy.

In some embodiments of the fluorinated polymers, compositions, and methods disclosed herein, the fluorinated polymer is a nonionic polymer. In other embodiments, the fluorinated polymer may also contain at least one anionic group, cationic group, or amphoteric group.

In some embodiments, fluorinated polymers according to the present disclosure are represented by formula:

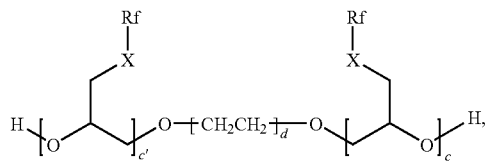

wherein X and Rf are as defined above. In some embodiments of compositions according to the present disclosure, the fluorinated polymer is represented by formula:

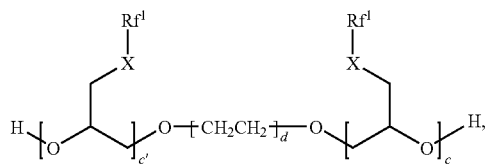

wherein X and Rf$^1$ are as defined above. In some embodiments of treatment methods, treated formations, and methods of making a composition disclosed herein, the fluorinated polymer is represented by formula:

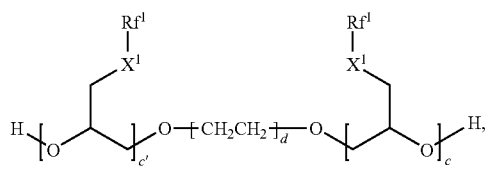

wherein X$^1$ and Rf$^1$ are as defined above. In these embodiments, c and c' each independently have a value from 0 to 5, with the proviso that c+c' is at least 2, 3, 4, 5, 6, 7, 8, 9, or even at least 10; and d is an integer from about 5 to about 50 (e.g., in a range from 5 to 10, 5 to 20, 5 to 25, 5 to 30, 5 to 40, 10 to 50, 10 to 40, 10 to 30, or 10 to 25).

In some embodiments of the fluorinated polymers, compositions, and/or the methods disclosed herein, at least a portion of the plurality of groups of formula —CH$_2$—CH$_2$—O— are present in second divalent units represented by formula:

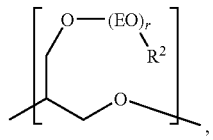

wherein
EO represents —CH$_2$CH$_2$O—;
each r is independently an integer from 1 to about 150; and
each R$^2$ is independently hydrogen or alkyl having 1 to 4 carbon atoms. In some embodiments, each R$^2$ is independently alkyl having 1 to 4 carbon atoms (e.g., methyl).

Fluorinated polymers according to and/or useful in practicing the present disclosure can be prepared by ring-opening polymerization of oxirane rings with pendant fluoroalkyl groups (hereinafter, "fluorinated oxiranes"). Some fluorinated oxiranes are available, for example, from commercial sources (e.g., 1H,1H,2H,3H,3H-perfluorononylene-1,2-oxide and 1H,1H,2H,3H,3H-perfluoroheptylene-1,2-oxide are available from ABCR GmbH & Co., Germany). Other fluorinated oxiranes can be prepared by conventional methods. For example, fluorinated alcohols and fluorinated sulfonamides can be treated with epichlorohydrin under basic conditions. Suitable fluorinated alcohols include trifluoroethanol, heptafluorobutanol, or nonafluorohexanol, which are commercially available, for example, from Sigma-Aldrich Corp., St. Louis, Mo. Suitable fluorinated sulfonamides include N-methylperfluorobutanesulfonamide and N-methylperfluorohexanesulfonamide, which can be prepared according to the methods described in Examples 1 and C6 of U.S. Pat. No. 6,664,534 (Savu et al.). Reactions of fluorinated alcohols or fluorinated sulfonamides with epichlorohydrin can be carried out, for example, in aqueous sodium hydroxide in the presence of a phase-transfer reagent such as methyltrialkyl(C8 to C10)ammonium chloride available from Sigma-Aldrich Corp. under the trade designation "ADOGEN 464" or in the presence of sodium hydride or sodium methoxide in a suitable solvent (e.g., tetrahydrofuran). Typically, reactions of fluorinated alcohols with epichlorohydrin are carried out at an elevated temperature (e.g., up to 40° C., 60° C., 70° C., or up to the reflux temperature of the solvent), but they may be carried out at room temperature.

Fluorinated oxiranes typically undergo ring-opening polymerization in the presence of Lewis Acid catalysts such as complexes of boron trifluoride (e.g., boron trifluoride etherate, boron trifluoride tetrahydropyran, and boron trifluoride tetrahydrofuran), phosphorous pentafluoride, antimony pentafluoride, zinc chloride, and aluminum bromide. The reaction can also be carried out in the presence of (CF$_3$SO$_2$)$_2$CH$_2$. Ring-opening polymerizations can be carried out neat or in a suitable solvent such as a hydrocarbon solvent (e.g., toluene) or a halogenated solvent (e.g., dichloromethane, carbon tetrachloride, trichloroethylene, or dichloroethane). The reactions can be carried out at or near room temperature or below (e.g., in a range from about 0° C. to 40° C.). The reactions can also be carried out above room temperature (e.g, up to 40° C., 60° C., 70° C., 90° C., or up to the reflux temperature of the solvent).

For some embodiments of the fluorinated polymers according to and/or useful for the present disclosure, the ring-opening polymerization is carried out in the presence of a monohydroxy alcohol or a diol comprising a plurality of groups having formula —$CH_2$—$CH_2$—O—. Compounds of this type include poly(ethylene glycols) of various molecular weights (e.g., number average molecular weights of at least 200, 300, or even 500 grams per mole up to 1000, 2000, 4000, 5000, 8000, 10000, or even 15000 grams per mole). Poly(ethylene glycols) are available, for example, from a variety of commercial sources (e.g., from Dow Chemical, Midland, Mich., under the trade designation "CARBOWAX"). Compounds having at least one hydroxyl group and plurality of groups having formula —$CH_2$—$CH_2$—O— also include block copolymers of ethylene oxide and propylene oxide having a molecular weight of about 500 to 15000 grams per mole (e.g., those available from BASF Corporation, Ludwigshafen, Germany, under the trade designation "PLURONIC").

For some embodiments of the fluorinated polymers according to and/or useful for the present disclosure, the ring-opening polymerization is carried out in the presence of an oxirane comprising a plurality of groups having formula —$CH_2CH_2O$—. Such oxiranes can be prepared, for example, by reaction of a mono- or dihydroxy poly(ethylene glycol) with epichlorohydrin using any of the methods described above for the reaction of fluorinated alcohols or fluorinated sulfonamides with epichlorohydrin.

The ring-opening polymerization of fluorinated oxiranes can also be carried out in the presence of diamines. Reactions of fluorinated oxiranes and diamines may be carried out in the presence or absence of a Lewis Acid catalyst. Useful diamines include polyetheramines available from Huntsman Corporation, The Woodlands, Texas, under the trade designation "JEFFAMINE ED". When such polyether diamines are used, at least a portion of the plurality of groups having formula —$CH_2$—$CH_2$—O— are present in segments represented by formula:

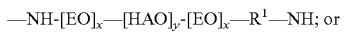

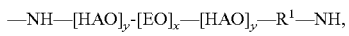

wherein EO and HAO are as defined above, each x independently is an integer from 1 to about 50, each y is independently an integer from 1 to about 10, and $R^1$ is an alkylene group.

For some embodiments of fluorinated polymers and compositions containing fluorinated polymers disclosed herein, the number average molecular weight of the fluorinated polymer is in a range from 1500, 2000, 2500, or even 3000 grams per mole up to 10,000, 20,000, 25,000, 30,000, 40,000, or 50,000 although higher molecular weights may also be useful.

For some embodiments of fluorinated polymers and compositions containing fluorinated polymers disclosed herein, the molar ratio of units having formula

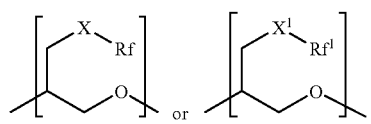

to units comprising a plurality of groups having formula —$CH_2CH_2O$— is up to 15:1, 10:1, 8:1, 6:1, or 4:1.

For some embodiments of fluorinated polymers and compositions containing fluorinated polymers disclosed herein, the ratio of fluorine atoms to oxygen atoms in the fluorinated polymer is up to 5:1, 4:1, 3:1, or 2:1.

It may be useful in some cases to include another monomer in the ring-opening polymerization of substituted oxiranes. For example, tetrahydrofuran, tetrahydropyran, 2-methyltetrahydrofuran, 1,4-dioxane, 1,3-dioxane, 1,3-dioxalane, and trioxane can be used as co-monomers in the polymerization reaction. Caprolactone may also be used as a co-monomer in the polymerization reaction; however, in some embodiments, the fluorinated polymer is free of carboxylate ester groups. In addition, other hydroxyl-functional compounds may be used in the reaction such as a fluorinated alcohol (e.g., trifluoroethanol, heptafluorobutanol, nonafluorohexanol), a diol (e.g., ethylene glycol, 1,4-butanediol, propylene glycol, 1,3-isobutenediol, 1,5-pentanediol, or neopentyl glycol), a multifunctional alcohol (e.g., pentaerythritol, trimethylolpropane), a monohydroxy alcohol (e.g., methanol, ethanol, or n-propanol), or combinations thereof.

The fluorinated polymers according to and/or useful for practicing the present disclosure herein may be nonionic, anionic, cationic, or amphoteric (e.g., zwitterionic). It is within the scope of this disclosure to use mixtures of fluorinated polymers. Typical anionic groups include carboxylates, sulfates, sulfonates, phosphates, and phosphonates. In some embodiments, the fluorinated polymer comprises at least one of —P(O)(OY)$_2$, —O—P(O)(OY)$_2$, (—O)$_2$—P(O)(OY), —SO$_3$Y, —O—SO$_3$Y, and —CO$_2$Y, wherein Y is hydrogen or a counter cation. In some embodiments, the anionic group is —O—P(O)(OY)$_2$ or —O—SO$_3$Y. In some embodiments, Y is hydrogen. In some embodiments, Y is a counter cation. Exemplary Y counter cations include alkali metal ions (e.g., sodium, potassium, and lithium), ammonium, alkyl ammonium (e.g., dialkylammonium, trialkylammonium, and tetraalkylammonium wherein alkyl is optionally substituted by hydroxyl, fluorine, or aryl), and five to seven membered heterocyclic groups having a positively charged nitrogen atom (e.g, a pyrrolium ion, pyrazolium ion, pyrrolidinium ion, imidazolium ion, triazolium ion, isoxazolium ion, oxazolium ion, thiazolium ion, isothiazolium ion, oxadiazolium ion, oxatriazolium ion, dioxazolium ion, oxathiazolium ion, pyridinium ion, pyridazinium ion, pyrimidinium ion, pyrazinium ion, piperazinium ion, triazinium ion, oxazinium ion, piperidinium ion, oxathiazinium ion, oxadiazinium ion, and morpholinium ion, any of which may be partially or fully fluorinated). In some embodiments, Y is an alkali metal ion (e.g., sodium, potassium, and lithium). In some embodiments, Y is ammonium.

In some embodiments, the fluorinated polymer is a cationic polymer having at least 1, 2, 3, 4, or even 5 cationic groups. Typical cationic groups include quaternary ammonium and phosphonium groups. The ammonium and phosphonium groups may be substituted by up to four alkyl groups (e.g., dialkylammonium, trialkylammonium, and tetraalkylammonium wherein alkyl is optionally substituted by hydroxyl, fluoride, or aryl). Typical anionic counterions in cationic polymers include halides (i.e., fluoride, chloride, bromide, and iodide), organic acid salts (e.g., acetate and citrate), organic sulfonic acid salts (e.g., alkylsulfates), nitrate, and tetrafluoroborate. The organic acid salts and sulfonic acid salts may be partially fluorinated or perfluorinated. Counter ions for cationic surfactants can also include anionic surfactants (e.g., fluorinated anionic surfactants).

In some embodiments, the fluorinated polymer is an amine-oxide polymer (e.g., neutralized with an anionic surfactant such as a fluorinated anionic surfactant).

Polymers made by ring-opening polymerizations of oxiranes and optionally other monomers often contain a hydroxyl end group, which can be converted, for example, to a anionic end group to prepare anionic fluorinated polymers or to a cationic end group to prepare a cationic fluorinated polymer. For example, sulfuric acid can be added to a hydroxyl-terminated polymer to prepare an anionic polymer having sulfate end groups. The counter ion can then be exchanged using conventional methods. The acid (e.g., sulfuric acid) can be added to the polymer at a temperature in a range from about −20° C. to 50° C. (or −5° C. to 15° C.) in a suitable solvent (e.g., tetrahydrofuran). Neutralization with a base (e.g., aqueous ammonium hydroxide) can be carried out at a temperature in a range from about 0° C. to 60° C., or about 15° C. to 40° C. In another example, terminal hydroxyl groups can be converted to leaving groups (e.g., alkyl or arylsulfonate esters), which can then be treated with nucleophilic tertiary amines to provide a cationic polymer have alkylammonium end groups. Sulfonate esters can be prepared, for example, by treating the terminal hydroxyl groups with a sulfonic anhydride (e.g., trifluoromethane sulfonic anhydride) or a sulfonyl halide (e.g., para-toluene sulfonyl chloride), typically in the presence of triethylamine in a suitable organic solvent at a temperature below room temperature (e.g., about −40° C. to about 0° C.). A tertiary amine (e.g., trimethylamine, triethylamine, N-methylpiperazine, N-methylpyrrolidine, or 1,4-diazabicyclo(2.2.2)octane) can then be used to displace the sulfonate and provide the cationic polymer.

In some embodiments, fluorinated polymers according to and/or useful in practicing the present disclosure are free of silane groups (i.e., a group having at least one Si—O—Z moiety, wherein Z is H or substituted or unsubstituted alkyl or aryl). In some embodiments, the fluorinated polymer is free of carboxylate ester, phosphate ester, and ortho ester functional groups. The absence of carboxylate ester groups may be advantageous, for example, to prevent hydrolysis of the polymer in the presence of some brines and at some temperatures when delivering the fluorinated polymer to a geological zone. The absence of silane groups may be advantageous, for example, because silane groups may undergo hydrolysis and form polysiloxanes in the presence of some brines and at some temperatures.

Fluorinated polymers disclosed herein may be present in solvent. Compositions according to and/or useful for practicing the present disclosure include solvent. Examples of useful solvents for any of these methods include organic solvents, water, easily gasified fluids (e.g., ammonia, low molecular weight hydrocarbons, and supercritical or liquid carbon dioxide), and combinations thereof. In some embodiments, the compositions are essentially free of water (i.e., contains less than 0.1 percent by weight of water based on the total weight of the composition). In some embodiments, the solvent is a water-miscible solvent (i.e., the solvent is soluble in water in all proportions). Examples of organic solvents include polar and/or water-miscible solvents, for example, monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, dipropylene glycol, or poly(propylene glycol)), triols (e.g., glycerol, trimethylolpropane), or pentaerythritol; ethers such as diethyl ether, methyl t-butyl ether, tetrahydrofuran, p-dioxane, or polyol ethers (e.g., glycol ethers (e.g., ethylene glycol monobutyl ether, diethylene glycol monomethyl ether, dipropylene glycol monomethyl ether, propylene glycol monomethyl ether, 2-butoxyethanol, or those glycol ethers available under the trade designation "DOWANOL" from Dow Chemical Co., Midland, Mich.)); ketones (e.g., acetone or 2-butanone); and combinations thereof.

In some embodiments of the compositions, treatment methods, and the methods of making a composition disclosed herein, the solvent comprises at least one of a polyol or polyol ether independently having from 2 to 25 (in some embodiments, 2 to 15, 2 to 10, 2 to 9, or even 2 to 8) carbon atoms. In some embodiments, the solvent comprises a polyol. The term "polyol" refers to an organic molecule consisting of C, H, and O atoms connected one to another by C—H, C—C, C—O, O—H single bonds, and having at least two C—O—H groups. In some embodiments, useful polyols have 2 to 25, 2 to 20, 2 to 15, 2 to 10, 2 to 8, or even 2 to 6 carbon atoms. In some embodiments, the solvent comprises a polyol ether. The term "polyol ether" refers to an organic molecule consisting of C, H, and O atoms connected one to another by C—H, C—C, C—O, O—H single bonds, and which is at least theoretically derivable by at least partial etherification of a polyol. In some embodiments, the polyol ether has at least one C—O—H group and at least one C—O—C linkage. Useful polyol ethers may have from 3 to 25 carbon atoms, 3 to 20, 3 to 15, 3 to 10, 3 to 9, 3 to 8, or even from 5 to 8 carbon atoms. In some embodiments, the polyol is at least one of ethylene glycol, propylene glycol, poly(propylene glycol), 1,3-propanediol, or 1,8-octanediol, and the polyol ether is at least one of 2-butoxyethanol, diethylene glycol monomethyl ether, ethylene glycol monobutyl ether, dipropylene glycol monomethyl ether, or 1-methoxy-2-propanol. In some embodiments, the polyol and/or polyol ether has a normal boiling point of less than 450° F. (232° C.), which may be useful, for example, to facilitate removal of the polyol and/or polyol ether from a well after treatment.

In some embodiments of compositions, treatment methods, and methods of making a composition disclosed herein, the solvent comprises at least one of water, a monohydroxy alcohol, an ether, or a ketone, wherein the monohydroxy alcohol, the ether, and the ketone each independently have up to 4 carbon atoms. Exemplary monohydroxy alcohols having from 1 to 4 carbon atoms include methanol, ethanol, n-propanol, isopropanol, 1-butanol, 2-butanol, isobutanol, and t-butanol. Exemplary ethers having from 2 to 4 carbon atoms include diethyl ether, ethylene glycol methyl ether, tetrahydrofuran, p-dioxane, and ethylene glycol dimethyl ether. Exemplary ketones having from 3 to 4 carbon atoms include acetone, 1-methoxy-2-propanone, and 2-butanone. In some embodiments, useful solvents for practicing the methods disclosed herein comprise at least one of methanol, ethanol, isopropanol, tetrahydrofuran, or acetone.

In some embodiments of the treatment methods and the methods of making a composition disclosed herein, the compositions comprise at least two different solvents. In some embodiments, the solvent comprises at least one of a polyol or polyol ether independently having from 2 to 25 (in some embodiments, 2 to 15, 2 to 10, 2 to 9, or even 2 to 8) carbon atoms and at least one of water, a monohydroxy alcohol, an ether, or a ketone, wherein the monohydroxy alcohol, the ether, and the ketone each independently have up to 4 carbon atoms. In these embodiments, in the event that a component of the solvent is a member of two functional classes, it may be used as either class but not both. For example, ethylene glycol methyl ether may be a polyol ether or a monohydroxy alcohol, but not as both simultaneously. In these embodiments, each solvent component may be present as a single component or a mixture of components. In some embodiments, compositions useful for practicing any of the methods disclosed herein comprise at least one of a polyol or polyol ether independently having from 2 to 25 (in some embodiments, 2 to 15, 2 to 10, 2 to 9, or even 2 to 8) carbon atoms and at least one monohydroxy alcohol having up to 4 carbon atoms. In some embodiments, the solvent consists essentially of (i.e., does not contain any components that materially affect water solubilizing or displacement properties of the composition under downhole conditions) at least one of a polyol having from 2 to 25 (in some embodiments, 2 to 20, 2 to 15, 2 to 10, 2 to 9, 2 to 8, or even 2 to 6) carbon atoms or polyol ether having from 3 to 25 (in some embodiments, 3 to 20, 3 to 15, 3 to 10, 3 to 9, 3 to 8, or even from 5 to 8) carbon atoms, and at least one monohydroxy alcohol having from 1 to 4 carbon atoms, ether having from 2 to 4 carbon atoms, or ketone having from 3 to 4 carbon atoms. Typically, the solvents described herein are capable of solubilizing more brine in the presence of fluorinated polymers than methanol alone.

For any of the embodiments of the compositions and methods disclosed herein, wherein the compositions comprise at least one of a polyol or polyol ether independently having from 2 to 25 (in some embodiments, 2 to 15, 2 to 10, 2 to 9, or 2 to 8) carbon atoms, the polyol or polyol ether is present in the composition at least 50, 55, 60, or 65 percent by weight and up to 75, 80, 85, or 90 percent by weight, based on the total weight of the composition. Exemplary solvent combinations that contain at least one of a polyol or polyol ether include 1,3-propanediol (80%)/isopropanol (IPA) (20%), propylene glycol (70%)/IPA (30%), propylene glycol (90%)/IPA (10%), propylene glycol (80%)/IPA (20%), ethylene glycol (50%)/ethanol (50%), ethylene glycol (70%)/ethanol (30%), propylene glycol monobutyl ether (PGBE) (50%)/ethanol (50%), PGBE (70%)/ethanol (30%), dipropylene glycol monomethyl ether (DPGME) (50%)/ethanol (50%), DPGME (70%)/ethanol (30%), diethylene glycol monomethyl ether (DEGME) (70%)/ethanol (30%), triethylene glycol monomethyl ether (TEGME) (50%)/ethanol (50%), TEGME (70%)/ethanol (30%), 1,8-octanediol (50%)/ethanol (50%), propylene glycol (70%)/tetrahydrofuran (THF) (30%), propylene glycol (70%)/acetone (30%), propylene glycol (70%), methanol (30%), propylene glycol (60%)/IPA (40%), 2-butoxyethanol (80%)/ethanol (20%), 2-butoxyethanol (70%)/ethanol (30%), 2-butoxyethanol (60%)/ethanol (40%), propylene glycol (70%)/ethanol (30%), ethylene glycol (70%)/IPA (30%), and glycerol (70%)/IPA (30%), wherein the exemplary percentages are by weight are based on the total weight of solvent. In some embodiments of the methods disclosed herein, the solvent comprises up to 50, 40, 30, 20, or 10 percent by weight of a monohydroxy alcohol having up to 4 carbon atoms, based on the total weight of the composition.

The amount of solvent typically varies inversely with the amount of other components in compositions useful in practicing any of the methods disclosed herein. For example, based on the total weight of the composition the solvent may be present in the composition in an amount of from at least 10, 20, 30, 40, or 50 percent by weight or more up to 60, 70, 80, 90, 95, 98, or even 99 percent by weight, or more.

Typically, in compositions according to and/or useful for practicing any of the methods described herein, the fluorinated polymer is present in the composition at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight, based on the total weight of the composition. For example, the amount of the fluorinated polymer in the compositions may be in a range of from 0.01 to 10, 0.1 to 10, 0.1 to 5, 1 to 10, or even in a range from 1 to 5 percent by weight, based on the total weight of the composition. Lower and higher amounts of the fluorinated polymer in the compositions may also be used, and may be desirable for some applications.

The ingredients for compositions described herein including fluorinated polymers, solvents, and optionally water can be combined using techniques known in the art for combining these types of materials, including using conventional magnetic stir bars or mechanical mixer (e.g., in-line static mixer and recirculating pump).

In some embodiments of treatment methods according to the present disclosure, the hydrocarbon-bearing formation has brine. The brine present in the formation may be from a variety of sources including at least one of connate water, flowing water, mobile water, immobile water, residual water from a fracturing operation or from other downhole fluids, or crossflow water (e.g., water from adjacent perforated formations or adjacent layers in the formation). In some embodiments, the brine is connate water. In some embodiments, the brine causes water blocking (i.e., declining productivity resulting from increasing water saturation in a well). In some embodiments, useful solvents at least one of at least partially solubilize or at least partially displace brine in the hydrocarbon-bearing formation. By the term "solubilizes" the brine, it is meant that the solvent dissolves all or nearly all (e.g., at least 95% including up to 100%) of the water and the salts in the brine. Although not wanting to be bound by theory, it is believed that the effectiveness of the treatment methods disclosed herein for improving hydrocarbon productivity of a particular oil and/or gas well having brine accumulated in the near wellbore region will typically be determined by the ability of the composition to dissolve or displace the quantity of brine present in the near wellbore region of the well. Hence, at a given temperature greater amounts of compositions having lower brine solubility (i.e., compositions that can dissolve a relatively lower amount of brine) will typically be needed than in the case of compositions having higher brine solubility and containing the same fluorinated polymer at the same concentration.

In some embodiments of treatment methods according to the present disclosure, combining the composition and the brine of the hydrocarbon-bearing formation at the temperature of the hydrocarbon-bearing formation does not cause the fluorinated polymer to phase separate. The phase behavior is typically evaluated prior to contacting the hydrocarbon-bearing formation with the composition by obtaining a sample of the brine from the hydrocarbon-bearing formation and/or analyzing the composition of the brine from the hydrocarbon-bearing formation. If a sample of the brine from the hydrocarbon-bearing formation is analyzed, an equivalent brine having the same or similar composition to the composition of the brine in the formation can be prepared. The brine and the composition (i.e., the fluorinated polymer-solvent composition) are combined (e.g., in a container) at the temperature and then mixed together (e.g., by shaking or stirring). The mixture is then maintained at the temperature for 15 minutes, removed from the heat, and immediately visually evaluated to see if it phase separates or if precipitation occurs. In some embodiments, the brine has at least 2, 3, 4, 5, 6, 7, 8, 9, or even at least 10 weight percent dissolved salts, based on the total weight of the brine. In some embodiments, the amount of brine that is added before phase separation occurs is at least 5, 10, 15, 20, 25, 30, 35, 40, 45, or even at least 50% by weight, based on the total weight of brine and fluorinated polymer-solvent composition combined in the phase behavior evaluation.

Although not wishing to be bound by theory, it is believed that treatment methods according to the present disclosure will provide more desirable results when the composition is homogenous at the temperature(s) encountered in the hydrocarbon-bearing formation. Accordingly, the phase behavior of the composition and the brine can be evaluated over an extended period of time (e.g., 1 hour, 12 hours, 24 hours or longer) to determine if any phase separation, precipitation, or cloudiness is observed. By adjusting the relative amounts of brine (e.g., model brine) and the fluorinated polymer-solvent composition, it is possible to determine the maximum brine uptake capacity (above which phase separation occurs) of the fluorinated polymer-solvent composition at a given temperature. Varying the temperature at which the above procedure is carried out typically results in a more complete understanding of the suitability of fluorinated polymer-solvent compositions as treatment compositions for a given well.

In some embodiments of the treatment methods disclosed herein, when the composition is contacting the hydrocarbon-bearing formation, the fluorinated polymer has a cloud point that is above the temperature of the hydrocarbon-bearing formation. Although not wishing to be bound by theory, it is believed that once the composition contacts a hydrocarbon-bearing formation (e.g., downhole), the fluorinated polymer will adsorb onto the formation out of solution. The term "cloud point" refers to the temperature at which the fluorinated polymer becomes non-homogeneous in the composition. This temperature can depend on many variables (e.g., concentration of the fluorinated polymer, solvent composition, brine concentration and composition, hydrocarbon concentration and composition, and the presence of other components (e.g., surfactants)).

In some embodiments of the treatment methods disclosed herein, when the composition is contacting the hydrocarbon-bearing formation, the hydrocarbon-bearing formation is substantially free of precipitated salt. As used herein, the term "substantially free of precipitated salt" refers to an amount of salt that does not interfere with the ability of the composition (or the fluorinated polymer) to increase the gas permeability of the hydrocarbon-bearing formation. In some embodiments, "substantially free of precipitated salt" means that no precipitate is visually observed. In some embodiments, "substantially free of precipitated salt" is an amount of salt that is less than 5% higher than the solubility product at a given temperature and pressure.

In some embodiments of the treatment methods disclosed herein, the hydrocarbon-bearing formation has both liquid hydrocarbons and gas, and the hydrocarbon-bearing formation has at least a gas permeability that is increased after the hydrocarbon-bearing formation is contacted with the composition. In some embodiments, the gas permeability after contacting the hydrocarbon-bearing formation with the composition is increased by at least 5 percent (in some embodiments, by at least 10, 15, 20, 30, 40, 50, 60, 70, 80, 90, or even 100 percent or more) relative to the gas permeability of the formation before contacting the formation with the composition. In some embodiments, the gas permeability is a gas relative permeability. In some embodiments, the liquid (e.g., oil or condensate) permeability in the hydrocarbon-bearing formation is also increased (in some embodiments, by at least 5, 10, 15, 20, 30, 40, 50, 60, 70, 80, 90, or even 100 percent or more) after contacting the formation with the composition. In some embodiments, useful compositions (and useful solvents) at least partially solubilize or at least partially displace liquid hydrocarbons in the hydrocarbon-bearing formation.

The hydrocarbon-bearing formation having both gas and liquid hydrocarbons may have gas condensate, black oil, or volatile oil and may comprise, for example, at least one of methane, ethane, propane, butane, pentane, hexane, heptane, octane, nonane, decane, or higher hydrocarbons. The term "black oil" refers to the class of crude oil typically having gas-oil ratios (GOR) less than about 2000 scf/stb (356 $m^3/m^3$). For example, a black oil may have a GOR in a range from about 100 (18), 200 (36), 300 (53), 400 (71), or even 500 scf/stb (89 $m^3/m^3$) up to about 1800 (320), 1900 (338), or even 2000 scf/stb (356 $m^3/m^3$). The term "volatile oil" refers to the class of crude oil typically having a GOR in a range between about 2000 and 3300 scf/stb (356 and 588 $m^3/m^3$). For example, a volatile oil may have a GOR in a range from about 2000 (356), 2100 (374), or even 2200 scf/stb (392 $m^3/m^3$) up to about 3100 (552), 3200 (570), or even 3300 scf/stb (588 $m^3/m^3$).

Generally, for the treatment methods disclosed herein, the amounts of the fluorinated polymer and solvent (and type of solvent) is dependent on the particular application since conditions typically vary between wells, at different depths of individual wells, and even over time at a given location in an individual well. Advantageously, treatment methods according to the present disclosure can be customized for individual wells and conditions.

An example of such customization is provided in the method of making a composition disclosed herein. Methods of making a composition according to the present disclosure include receiving (e.g., obtaining or measuring) data comprising the temperature and at least one of the hydrocarbon composition or the brine composition (including the brine saturation level and components of the brine) of a selected geological zone of a hydrocarbon-bearing formation. These data can be obtained or measured using techniques well known to one of skill in the art. The methods of making a composition disclosed herein also include generating a formulation based at least in part on compatibility information concerning the fluorinated polymer, the solvent, the temperature, and at least one of the hydrocarbon composition or brine composition of the selected geological zone of the formation. In some embodiments, the compatibility information comprises information concerning phase stability of a mixture of the fluorinated polymer, the solvent, and a model brine composition, wherein the model brine composition is based at least partially on the brine composition of the geological zone of the formation. The phase stability of a solution or dispersion can be evaluated using the phase behavior evaluation described above. The phase behavior of the composition and the brine can be evaluated over an extended period of time (e.g., 1 hour, 12 hours, 24 hours, or longer) to determine if any phase separation or cloudiness is observed.

In some embodiments, the compatibility information comprises information concerning solid (e.g., salts or asphaltenes) precipitation from a mixture of the fluorinated polymer, the solvent, a model brine composition, and a model hydrocarbon composition, wherein the model brine composition is based at least partially on the brine composition of the geological zone of the formation, and wherein the model hydrocarbon composition is based at least partially on the hydrocarbon composition of the geological zone of the formation.

In additional to using a phase behavior evaluation, it is also contemplated that one may be able obtain the compatibility information, in whole or in part, by computer simulation or by referring to previously determined, collected, and/or tabulated information (e.g., in a handbook or a computer database).

Exemplary hydrocarbon-bearing formations that may be treated according to the present disclosure include siliciclastic (e.g., shale, conglomerate, diatomite, sand, and sandstone) or carbonate (e.g., limestone) formations. Typically, compositions (e.g., including nonionic polymers) and methods according to the present disclosure can be used to treat siliciclastic formations. In some embodiments, the hydrocarbon-bearing formation is predominantly sandstone (i.e., at least 50 percent by weight sandstone).

Methods according to the present disclosure may be practiced, for example, in a laboratory environment (e.g., on a core sample (i.e., a portion) of a hydrocarbon-bearing formation or in the field (e.g., on a subterranean hydrocarbon-bearing formation situated downhole). Typically, the methods disclosed herein are applicable to downhole conditions having a pressure in a range from about 1 bar (100 kPa) to about 1000 bars (100 MPa) and have a temperature in a range from about 100° F. (37.8° C.) to 400° F. (204° C.) although the methods are not limited to hydrocarbon-bearing formations having these conditions. Those skilled in the art, after reviewing the instant disclosure, will recognize that various factors may be taken into account in practice of the any of the disclosed methods including the ionic strength of the brine, pH (e.g., a range from a pH of about 4 to about 10), and the radial stress at the wellbore (e.g., about 1 bar (100 kPa) to about 1000 bars (100 MPa)).

In the field, contacting a hydrocarbon-bearing formation with a composition described herein can be carried out using methods (e.g., by pumping under pressure) well known to those skilled in the oil and gas art. Coil tubing, for example, may be used to deliver the treatment composition to a particular geological zone of a hydrocarbon-bearing formation. In some embodiments of practicing the methods described herein it may be desirable to isolate a geological zone (e.g., with conventional packers) to be contacted with the composition.

Methods of using compositions described herein are useful, for example on both existing and new wells. Typically, it is believed to be desirable to allow for a shut-in time after compositions described herein are contacted with the hydrocarbon-bearing formations. Exemplary shut-in times include a few hours (e.g., 1 to 12 hours), about 24 hours, or even a few (e.g., 2 to 10) days. After the treatment composition has been allowed to remain in place for the desired time, the solvent present in the composition may be recovered from the formation by simply pumping fluids up tubing in a well as is commonly done to produce fluids from a formation.

In some embodiments of treatment methods according to the present disclosure, the method comprises contacting the hydrocarbon-bearing formation with a fluid prior to contacting the hydrocarbon-bearing formation with the composition, wherein the fluid at least one of partially solubilizes or partially displaces the brine in the hydrocarbon-bearing formation. In some embodiments, the fluid partially solubilizes the brine. In some embodiments, the fluid partially displaces the brine. In some embodiments, the fluid is substantially free of fluorinated polymers. The term "substantially free of fluorinated polymers" refers to fluid that may have a fluorinated polymer in an amount insufficient for the fluid to have a cloud point (e.g., when it is below its critical micelle concentration). A fluid that is substantially free of fluorinated polymers may be a fluid that has a fluorinated polymer but in an amount insufficient to alter the wettability of, for example, a hydrocarbon-bearing formation under downhole conditions. A fluid that is substantially free of fluorinated polymers includes those that have a weight percent of such polymers as low as 0 weight percent. The fluid may be useful for decreasing the concentration of at least one of the salts present in the brine prior to introducing the composition to the hydrocarbon-bearing formation. The change in brine composition may change the results of a phase behavior evaluation (e.g., the combination of a composition with a first brine prior to the fluid preflush may result in precipitation of the fluorinated polymer or a salt while the combination of the composition with the brine after the fluid preflush may result in no precipitation.)

In some embodiments of treatment methods disclosed herein, the fluid comprises at least one of toluene, diesel, heptane, octane, or condensate. In some embodiments, the fluid comprises at least one of water, methanol, ethanol, or isopropanol. In some embodiments, the fluid comprises at least one of a polyol or polyol ether independently having from 2 to 25 carbon atoms. In some embodiments, useful polyols have 2 to 20, 2 to 15, 2 to 10, 2 to 8, or even 2 to 6 carbon atoms. Exemplary useful polyols include ethylene glycol, propylene glycol, poly(propylene glycol), 1,3-propanediol, trimethylolpropane, glycerol, pentaerythritol, and 1,8-octanediol. In some embodiments, useful polyol ethers may have from 3 to 25 carbon atoms, 3 to 20, 3 to 15, 3 to 10, 3 to 8, or even from 5 to 8 carbon atoms. Exemplary useful polyol ethers include diethylene glycol monomethyl ether, ethylene glycol monobutyl ether, dipropylene glycol monomethyl ether, 2-butoxyethanol, and 1-methoxy-2-propanol. In some embodiments, the fluid comprises at least one monohydroxy alcohol, ether, or ketone independently having up to four carbon atoms. In some embodiments, the fluid comprises at least one of nitrogen, carbon dioxide, or methane.

In some embodiments, the fluid at least one of partially solubilizes or displaces the liquid hydrocarbons in the hydrocarbon-bearing formation.

In some embodiments of the treatment methods disclosed herein, the hydrocarbon-bearing formation has at least one fracture. In some embodiments, fractured formations have at least 2, 3, 4, 5, 6, 7, 8, 9, or even 10 or more fractures. As used herein, the term "fracture" refers to a fracture that is man-made. In the field, for example, fractures are typically made by injecting a fracturing fluid into a subterranean geological formation at a rate and pressure sufficient to open a fracture therein (i.e., exceeding the rock strength). In some of these embodiments, the fracture has a plurality of proppants therein. Prior to delivering the proppants into a fracture, the proppants may be treated with a fluorinated polymer or may be untreated (e.g., may comprise less than 0.1% by weight fluorinated polymer, based on the total weight of the plurality of proppants). Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

In some embodiments of methods of treating fractured formations, the proppants form packs within a formation and/or wellbore. Proppants may be selected to be chemically compatible with the solvents and compositions described herein. Examples of particulate solids include fracture proppant materials introducible into the formation as part of a hydraulic fracture treatment, sand control particulate introducible into the wellbore/formation as part of a sand control treatment such as a gravel pack or frac pack.

In some embodiments of methods of treating fractured formations, the amount of the composition introduced into the fractured formation is based at least partially on the volume of the fracture(s). The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation. Coil tubing, for example, may be used to deliver the treatment composition to a particular fracture. In some embodiments, in practicing the methods disclosed herein it may be desirable to isolate the fracture (e.g., with conventional packers) to be contacted with the treatment composition.

In some embodiments, wherein the formation treated according to the methods described herein has at least one fracture, the fracture has a conductivity, and after the composition contacts at least one of the fracture or at least a portion of the plurality of proppants, the conductivity of the fracture is increased (e.g., by 25, 50, 75, 100, 125, 150, 175, 200, 225, 250, 275, or even by 300 percent).

In some embodiments of the methods disclosed herein, wherein treating the formation with the composition provides an increase in at least one of the gas permeability or the liquid permeability of the formation, the formation is a non-fractured formation (i.e., free of man-made fractures). Advantageously, treatment methods disclosed herein typically provide an increase in at least one of the gas permeability or the hydrocarbon liquid permeability of the formation without fracturing the formation.

Referring to FIG. 1, an exemplary offshore oil platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

While the drawing depicts an offshore operation, the skilled artisan will recognize that the methods for treating a production zone of a wellbore are equally well-suited for use in onshore operations. Also, while the drawing depicts a vertical well, the skilled artisan will also recognize that methods according to the present disclosure are equally well-suited for use in deviated wells, inclined wells or horizontal wells.

Fluorinated polymers according to the present disclosure may also be useful, for example, as industrial coating additives due to their surfactant properties. The fluorinated polymers disclosed herein may provide better wetting and/or leveling of a coating to a substrate surface or better dispersability of a component (e.g., a thickening agent or pigment) within the coating formulation. Many industrial coating formulations typically include at least one polymeric material (e.g., a film-forming polymer) and at least one of water or solvent (e.g., methyl ethyl ketone and 1-methoxy-2-propanol). When a coating formulation is applied to a substrate, solvent evaporates, and the polymer particles coalesce to form a continuous film. Coating formulations are typically applied, dried, and optionally heated, leaving the finished product with a solid coating. The addition of fluorinated polymers according to the present invention may improve the film forming properties of some formulations by improving the ability of the coating to wet the substrate and/or by allowing for even evaporation of water and/or solvent (i.e., leveling) during film formation.

Advantages and embodiments of the methods disclosed herein are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight. In the Tables, "nd" means not determined. Unless otherwise noted, the reagents used in the Examples were obtained from Sigma-Aldrich, St. Louis, Mo.

EXAMPLES

In the following Examples, N-glycidyl-N-methylperfluorobutanesulfonamide (MeFBSG) was prepared as follows. N-Methylperfluorobutanesulfonamide (MeFBSA, 313 g, 1.0 mol; preparation described in U.S. Pat. No. 6,664,354 (Savu et al.) Example 1, Part A) was added to a stirred mixture of 220 g NaOCH$_3$ (1.02 mol; 25% NaOMe in MeOH). The solvent was removed under vacuum (pot temperature about 80° C.; 50 mm Hg). The resulting paste was dissolved in 250 mL THF and treated with 473 g (5.11 mol) epichlorohydrin and stirred at reflux for 4 hr. GLC analysis showed complete conversion of MeFBSA. The slurry was cooled, washed with water (300 mL) and the resulting lower layer was taken up in methylene chloride, rewashed with water (300 mL), and dried over MgSO$_4$. The product was stripped and one-plate distilled to a main cut of MeFBSG as a colorless liquid (260.8 g, by 95-105° C./0.3 mmHg).

Example 1

In a 4-ounce polymerization bottle, MeFBSG (14.75 grams, 0.04 mole) and 0.01 mole of poly(ethylene glycol) having an average number average molecular weight of 600 grams per mole (obtained from Sigma-Aldrich, St. Louis, Mo.) were stirred until a homogeneous mixture was observed. $(CF_3SO_2)_2CH_2$ (0.21 gram) (obtained from 3M Company, St. Paul, Minn.) was added, and the bottle was heated at 80° C. for 48 hours to provide a reddish-brown clear viscous liquid.

The surface tension measured for a 0.1% solution of the fluorinated polymer in water was 21.8 dyn/cm.

Example 2

Example 2 was prepared according to the method of Example 1 except that poly(ethylene glycol) having a number average molecular weight of 1000 (obtained from Sigma-Aldrich) was used instead of poly(ethylene glycol) having a number average molecular weight of 600 grams per mole. The surface tension measured for a 0.1% solution of the fluorinated polymer in water was 20.5 dyn/cm.

Example 3

Example 3 was prepared according to the method of Example 1 except that poly(ethylene glycol) having a number average molecular weight of 1500 (obtained from Sigma-Aldrich) was used instead of poly(ethylene glycol) having a number average molecular weight of 600 grams per mole.

Example 4

Example 4 was prepared according to the method of Example 1 except that poly(ethylene glycol) having a number average molecular weight of 3400 (obtained from GFS Chemicals, Columbus, Ohio) was used instead of poly(ethylene glycol) having a number average molecular weight of 600 grams per mole. The surface tension measured for a 0.1% solution of the fluorinated polymer in water was 20.1 dyn/cm.

Example 5

Example 5 was prepared according to the method of Example 1 except that poly(ethylene glycol) having a molecular weight of 3400 grams per mole (obtained from GFS Chemicals) was used instead of poly(ethylene glycol) having a number average molecular weight of 600 grams per mole and 0.06 mole of MeFBSG was used.

Example 6

Example 6 was prepared according to the method of Example 1 except that poly(ethylene glycol) having a molecular weight of 3400 grams per mole (obtained from GFS Chemicals) was used instead of poly(ethylene glycol) having a number average molecular weight of 600 grams per mole and 0.08 mole of MeFBSG was used.

Example 7

4.3 grams of sodium hydride (obtained as a 60% dispersion in mineral oil) was washed with 30 mL of hexane and then suspended in dry tetrahydrofuran (THF, 70 mL). A solution of 75 grams (0.1 mole) of methyl poly(ethylene glycol) having a molecular weight of 750 grams per mole, obtained from Sigma-Aldrich in about 50 mL of dry THF was added dropwise. The resulting viscous yellow solution was added dropwise to 37 grams of epichlorohydrin in 20 mL of dry THF. Upon heating to reflux, a cloudy precipitate formed. The mixture was heated at reflux for 17 hours, cooled, filtered, and concentrated under reduced pressure to provide 71.9 grams of product mixture. Analysis by $^1$H nuclear magnetic resonance spectroscopy indicated a 70% conversion of methyl poly(ethylene glycol) to its glycidyl ether. A portion (51.5 grams) of the product mixture was washed twice with 75 mL of warm hexane and concentrated under reduced pressure.

A mixture of 8.06 grams of methyl poly(ethylene glycol) glycidyl ether and 3.68 grams of MeFBSG was placed in a 4-ounce polymerization bottle and warmed on a steam bath until the mixture became homogeneous. $(CF_3SO_2)_2CH_2$ (0.19 gram) (obtained from 3M Company) was added, and the bottle was heated at 80° C. for 42 hours to provide a light tan product. The product was combined with 6.0 grams sodium carbonate and 100 mL of dichloromethane, filtered, and concentrated under reduced pressure to provide 11.1 grams of fluorinated polymer.

Example 8

Example 8 was prepared according to the method of Example 1 except that 1,1,2,2-tetrafluoroethyl glycidyl ether (1.75 gram) was used instead of MeFBSG and 2.50 grams of poly(ethylene glycol) having a molecular weight of 1000 grams per mole was used instead of poly(ethylene glycol) having a number average molecular weight of 600 grams per mole. The reaction mixture contained 73 mg of $(CF_3SO_2)_2CH_2$ and was heated for 40 hours at 80° C.

The surface tension for a 0.1% solution of the fluorinated polymer in water was 30.0 dyn/cm at 1060 ppm.

Example 9

Example 9 was prepared according to the method of Example 8 except using 7.0 grams of 1,1,2,2-tetrafluoroethyl glycidyl ether, 5.0 grams of poly(ethylene glycol), and 192 mg of $(CF_3SO_2)_2CH_2$.

The surface tension for a 0.1% solution of the fluorinated polymer in water was 39.3 dyn/cm at 1060 ppm.

Example 10

Into a three-necked flask fitted with a stirrer, a heating mantle, a condenser and a thermometer were placed 15 grams MeFBSG (0.04 mole), 35 grams of a block copolymer of ethylene oxide and propylene oxide having an average molecular weight of 2200 (obtained from BASF Corporation, Ludwigshafen, Germany, under the trade designation "PLURONIC L-44") and 50 grams of toluene. The mixture was heated under a nitrogen atmosphere to 50° C., and then 0.2 gram boron trifluoride-etherate was added. An exothermic effect was observed. The reaction mixture was heated for 16 hours at 100° C., at which time an analysis by gas-liquid chromatography indicated that MeFBSG was consumed. Toluene was removed under reduced pressure at 100° C. using an aspirator vacuum to provide a viscous liquid.

Surface Tension Measurements

The surface tensions of 1000 parts per million (ppm) aqueous solutions of Examples 4, 5, and 6 were measured with an instrument obtained from Kruss USA, Matthews, N.C. under the trade designation "KRUSS K100" using a Wilhelmy plate method at room temperature. The instrument was programmed to make five repeat measurements. If the standard deviation of these five measurements was less than 0.07 mN/m, then it stopped and reported the average of these five measurements as the surface tension. If the standard deviation was larger than 0.07 mN/m, the instrument continued taking repeat measurements until the standard deviation of the last five measurements was less than 0.07 mN/m. Then it reported the average of the last five measurements as the surface tension.

The surface tensions for Examples 4, 5, and 6 were measured in water, 0.1 M aqueous acetic acid, and 0.1 M aqueous sodium hydroxide over a period of 29 days. The surface tensions measured for each of these solutions on Days 0, 1, 5, 15, and 29, are shown in the table, below. In between measurements, the solutions were stored at 60° C.

| Example | Solution | Surface Tensions (mN/m) | | | | |
|---|---|---|---|---|---|---|
| | | Day 0 | Day 1 | Day 5 | Day 15 | Day 29 |
| 4 | Water | 20.7 | 20.6 | 20.1 | 20.1 | 20.3 |
| 4 | Acetic Acid | 20.2 | 20.1 | 20.0 | 20.5 | 21.6 |
| 4 | NaOH | 20.1 | 20.0 | 19.8 | 20.3 | 19.2 |
| 5 | Water | 19.9 | 19.9 | 19.9 | 20.2 | 20.4 |
| 5 | Acetic Acid | 19.9 | 19.9 | 19.7 | 20.2 | 20.5 |
| 5 | NaOH | 20.0 | 19.8 | 19.6 | 20.1 | 18.9 |
| 6 | Water | 19.7 | 19.8 | 19.9 | 20.0 | 20.1 |
| 6 | Acetic Acid | 20.0 | 19.5 | 19.5 | 20.4 | 20.2 |
| 6 | NaOH | 19.8 | 19.6 | 19.4 | 19.4 | 18.8 |

Examples 11 to 21

Examples 11 through 21 were prepared using the method of Example 10 except using the reagents listed in Table 1, below. The co-reagent having a plurality of groups of formula —CH$_2$CH$_2$O— were obtained from BASF under the trade designation "PLURONIC", from Dow Chemical Company, Midland, Mich. under the trade designation "CARBOWAX", and from Huntsman Chemical, The Woodlands, Texas under the trade designation "JEFFAMINE". Poly(ethylene glycol) with a number average molecular weight of 2000 (PEG 2000 diol) and a random poly(ethylene glycol) poly(propylene glycol) copolymer were obtained from Sigma-Aldrich. The full trade designation for each co-reagent is listed in Table 1, below.

TABLE 1

| Example | MeFBSG | Co-reagent (grams) | Further reagent |
|---|---|---|---|
| 11 | 35 grams | "PLURONIC L-44" (15) | none |
| 12 | 15 grams | "PLURONIC P-65" (35) | none |
| 13 | 15 grams | "PLURONIC F-88" (35) | none |
| 14 | 15 grams | PEG 2000 diol (35) | none |
| 15 | 15 grams | "CARBOWAX 350" (14.2) | none |
| 16 | 15 grams | "CARBOWAX 750" (30) | none |
| 17 | 15 grams | "JEFFAMINE ED-900" 36) | none |
| 18 | 15 grams | "JEFFAMINE ED 2000" (80) | none |
| 19 | 15 grams | "JEFFAMINE ED 2000" (80) | Diethylsulfate (12.3 grams, 0.08 mole) |
| 20 | 15 grams | "JEFFAMINE ED 2000" (80) | Propanesultone (9.8 grams, 0.08 mole) |
| 21 | 15 grams | Poly (EO/PO random (35) polymer, MW 12000) | none |

Static surface tensions were measured using the Du Nouy ring method in a Kruss K-12 tensiometer at 20° C. at 1000, 100, and 10 ppm. The results are shown in Table 2, below.

TABLE 2

| Example | Static surface tension (mN/m) | | |
|---|---|---|---|
| | 1000 ppm | 100 ppm | 10 ppm |
| 10 | 22.9 | 26.4 | 30.5 |
| 11 | 22.0 | 24.5 | 26.2 |
| 12 | 22.3 | 24.2 | 27.8 |
| 13 | 24.5 | 28.1 | 32.0 |
| 14 | 19.8 | 20.7 | 38.8 |
| 15 | 19.7 | 21.9 | 45.2 |
| 16 | 21.3 | 24.9 | 48.1 |

TABLE 2-continued

| Example | Static surface tension (mN/m) | | |
|---|---|---|---|
| | 1000 ppm | 100 ppm | 10 ppm |
| 17 | 22.1 | 29.9 | 42.2 |
| 18 | 22.4 | 23.6 | 31.7 |
| 19 | 25.6 | 27.1 | 37.9 |
| 20 | 21.8 | 23.7 | 32.0 |
| 21 | 23.2 | 25.5 | 33.0 |

Example 22

Part A

A solution of 800 grams (4.0 moles) of C$_3$F$_7$CH$_2$OH (obtained from 3M Company), 840 grams (9.1 moles) of epichlorohydrin (obtained from Sigma-Aldrich, St. Louis, Mo.), and 5 grams of methyltrialkyl(C8 to C10)ammonium chloride (obtained from Sigma-Aldrich under the trade designation "ANDOGEN 464") in 1000 mL tetrahydrofuran (THF) was treated 320 grams of 50 wt. % sodium hydroxide water (4.0 moles) dropwise over about one hour. The temperature at the end of the addition was 37° C. The mixture was stirred at 60° C. for 20 hours, and then most of the THF was removed on a rotary evaporator. The residue was dissolved in about 200 mL CH$_2$Cl$_2$, washed with 1 L water, dried over MgSO$_4$, and the resulting liquid subjected to one-plate distillation to yield a midcut of 307 grams of 1,1-dihydroperfluorobutyl-2,3-epoxypropyl ether, boiling at 55-65° C. at 1.0 to 1.1 mmHg.

Part B

The product from Part A (5.1 grams) and poly(ethylene glycol) diol (17.1 grams) having a number average molecular weight of 3400 were placed in a 125 mL polymerization bottle and this kept in an oven at 80° C. for about 1 hour, causing the solid poly(ethylene glycol) diol to melt. The mixture was briefly shaken, and 0.20 gram (CF$_3$SO$_2$)$_2$CH$_2$ was added. The bottles were replaced in the oven and maintained at 80° C. for 2.5 days. The resulting brown solids were taken up in 25 mL CH$_2$Cl$_2$, 4.0 grams granular Na$_2$CO$_3$ were added, and the mixture was shaken at low speed for 24 hours. Filtration, rinsing with CH$_2$Cl$_2$ and concentrating on a rotary evaporator gave 20.6 grams of a low-melting brown solid having a 4:1 molar ratio of the fluorinated units to the poly (ethylene glycol) diol.

The surface tension of a 0.1 wt % solution of Example 22 in water was measured with a Kruss K100 instrument using a Wilhelmy plate using the surface tension measurement method described above and found to be 21.7 mN/m.

Example 23

The method of Example 22, Part B was followed except that 7.68 grams of 1,1-dihydroperfluorobutyl-2,3-epoxypropyl ether and 17.1 grams of the poly(ethylene glycol) diol were used, and 21.5 grams of product having a 6:1 molar ratio of the fluorinated units to the poly(ethylene glycol) diol were obtained.

The surface tension of a 0.1 wt % solution of Example 23 in water was measured using the method described for Example 22 to give a value of 20.8 mN/m.

Example 24

The method of Example 22, Part B was followed except that 10.2 grams of 1,1-dihydroperfluorobutyl-2,3-epoxypropyl ether and 15.0 grams of the poly(ethylene glycol) diol having a number average molecular weight of 1500 were used, and 25.9 grams of product having a 4:1 molar ration of the fluorinated units to the poly(ethylene glycol) diol were obtained.

The surface tension of a 0.1 wt % solution of Example 24 in water was measured using the method described for Example 22 to give a value of 20.5 mN/m.

Example 25

Part A 2,3-Epoxypropyl-1,1,3-trihydroperfluorobutyl ether

A solution of 182 grams $CF_3CHFCF_2CH_2OH$ (obtained from 3M Company), 298 grams (3.2 moles) of epichlorohydrin, and 1.2 gram of methyltrialkyl(C8 to C10)ammonium chloride (obtained from Sigma-Aldrich under the trade designation "ANDOGEN 464") in 200 mL THF was treated dropwise with 80 grams of 50 wt. % aqueous sodium hydroxide (1 mole) over about 45 minutes. The temperature rose to 35° C. The reaction mixture was left stirring for two days at room temperature and then added to 1 L water. The liquid product was extracted into $CH_2Cl_2$ and rewashed with water and dried over $MgSO_4$. One plate distillation gave a main cut of 107.2 grams 2,3-epoxypropyl-1,1,3-trihydroperfluorobutyl ether, boiling point: 50-55° C./1.0 mmHg. Analysis by $^1H$ NMR confirmed the structure.

Part B

The method of Example 22, Part B was followed except that 4.76 grams of 2,3-epoxypropyl-1,1,3-trihydroperfluorobutyl ether was used instead of 1,1-dihydroperfluorobutyl-2,3-epoxypropyl ether and 17.1 grams of the poly(ethylene glycol) diol were used, and 19.5 grams of product having a 4:1 molar ratio of the fluorinated units to the poly(ethylene glycol) diol were obtained.

The surface tension of a 0.1 wt % solution of Example 25 in water was measured using the method described for Example 22 to give a value of 33.3 mN/m.

Example 26

The method of Example 22, Part B was followed except that 7.14 grams of 2,3-epoxypropyl-1,1,3-trihydroperfluorobutyl ether was used instead of 1,1-dihydroperfluorobutyl-2,3-epoxypropyl ether and 17.1 grams of the poly(ethylene glycol) diol were used, and 19.9 grams of product having a 6:1 molar ratio of the fluorinated units to the poly(ethylene glycol) diol were obtained.

The surface tension of a 0.1 wt. % solution of Example 26 in water was measured using the method described for Example 22 to give a value of 29.8 mN/m.

Example 27

The method of Example 22, Part B was followed except that 9.50 grams of 2,3-epoxypropyl-1,1,3-trihydroperfluorobutyl ether was used instead of 1,1-dihydroperfluorobutyl-2,3-epoxypropyl ether and 15.0 grams of a poly(ethylene glycol) diol having a number average molecular weight of 1500 were used, and 24.5 grams of product having a 4:1 molar ratio of the fluorinated units to the poly(ethylene glycol) diol were obtained. Analysis by $^1H$ NMR confirmed the structure indicated there were no residual epoxy groups.

The surface tension of a 0.1 wt. % solution of Example 27 in water was measured using the method described for Example 22 to give a value of 30.5 mN/m.

Fluorinated Polymer 1

The method described in U.S. Pat. No. 6,485,789 (Allewaert et al.), column 16, lines 13 to 22 was used to prepare intermediate 3 (INT-3 in Table 1).

Fluorinated Polymer 2

The method described in U.S. Pat. No. 6,485,789 (Allewaert et al.), column 16, lines 13 to 22 was used to prepare intermediate 5 (INT-5 in Table 1).

Brine

Water (92.25%) 5.9% sodium chloride, 1.6% calcium chloride, 0.23% magnesium chloride hexahydrate, and 0.05% potassium chloride were combined to provide the brine used for the compatibility evaluations and the core flood examples.

Comparative Materials

Comparative fluorinated surfactant A was a cationic water-dilutable fluoropolymer for porous surface treatments obtained from E. I. du Pont de Nemours and Co., Wilmington, Del. under the trade designation "ZONYL 8740".

Comparative fluorinated surfactant B was a nonionic fluorinated surfactant represented by formula $CF_3CF_2(CF_2CF_2)_{2-4}CH_2CH_2O(CH_2CH_2O)_xH$ obtained from E. I. du Pont de Nemours and Co. under the trade designation "ZONYL FSO".

Compatibility Evaluations I to XII

A fluorinated polymer (0.06 gram (g)) and solvents (Solvent A and Solvent B) were added to a vial to prepare a sample (3 g total amount, 2% w/w of fluorinated polymer). Brine was added in 0.25 g increments to the vial, and the vial was placed in a heated bath at 135° C. for 15 minutes. The vial was removed from the bath, and then visually inspected immediately to determine whether the sample was one phase. If the sample was one phase, the brine addition and heating steps were repeated until the sample was no longer one phase.

The Example used for each compatibility evaluation and initial percentages of solvents are shown in Table 3, below, and wherein the indicated weight percentages of brine are based on the combined total weight of the solvents, brine, and fluorinated polymer. The highest amount of brine that was compatible in the mixture (before phase separation occurred) is shown in Table 3, below.

TABLE 3

| Evaluation | Fluorinated Polymer | Solvent A (weight %) | Solvent B (weight %) | Brine, wt. % |
|---|---|---|---|---|
| I | Example 1 | Propylene glycol (PG) (69) | Isopropanol (IPA) (29) | 32.9% |
| II | Example 1 | PG (98) | Not used | 7.5% |
| III | Example 2 | PG (69) | IPA (29) | 36.4% |
| IV | Example 2 | PG (98) | Not used | 29% |
| V | Example 3 | PG (69) | IPA (29) | 42.4% |
| VI | Example 3 | PG (98) | Not used | 29% |
| VII | Example 4 | PG (69) | IPA (29) | 53.4% |
| VIII | Example 4 | PG (98) | | 45.0% |
| IX | Example 5 | PG (69) | IPA (29) | 32.9% |
| X | Example 5 | PG (98) | | 7.5% |
| XI | Fluorinated Polymer 2 | PG (69) | IPA (29) | 15% |
| XII | Fluorinated Polymer 2 | PG (98) | | 5% |

Combination of 2% by weight of Fluorinated Polymer 1, 69% by weight propylene glycol, and 29% by weight isopropanol did not provide a homogeneous mixture.

For the compatibility evaluations of Examples 22 to 27 and Comparative Example A, the method of Compatibility Evaluations I to XII was followed except that 1 gram of brine was added to the vial. For each evaluation of Examples 22 to 27 and Comparative Example A, the fluorinated polymer, solvents, and the observation are shown in Table 4, below.

TABLE 4

| Evaluation | Fluorinated Polymer | Solvent A (weight %) | Solvent B (weight %) | Observation |
|---|---|---|---|---|
| XIII | Example 22 | Propylene glycol (PG) (69) | Isopropanol (IPA) (29) | Hazy at room temperature, one phase at 135° C. |
| XIV | Example 23 | PG (69) | IPA (29) | One phase |
| XV | Example 24 | PG (69) | IPA (29) | One phase |
| XVI | Example 25 | PG (69) | IPA (29) | Hazy at room temperature, one phase at 135° C. |
| XVII | Example 26 | PG (69) | IPA (29) | One phase |
| XVIII | Example 27 | PG (69) | IPA (29) | One phase |
| IX | A | PG (69) | IPA (29) | One phase |

For the compatibility evaluations of Examples 5 and 6, the method of Compatibility Evaluations I to XII was followed except that 1 gram of brine was added to the vial, and the evaluation was carried out at 125° C. The solvents used for each evaluation were propylene glycol (69%) and isopropanol (29%), and each composition, when combined with the brine, resulted in one phase.

Core Flood Examples 1 to 3 and Comparative Examples A, B, and C

Composition Preparation

A fluorinated polymer and two solvents (Solvent A and Solvent B) were combined to make 600 grams of a 2% by weight solution of the fluorinated polymer. The components were mixed together using a magnetic stirrer and magnetic stir bar. The fluorinated polymers, solvents, and amounts (in wt. % based on the total weight of the composition) used for Core Flood Examples 1 to 3 and Comparative Examples A to C are shown in Table 5, below.

TABLE 5

| Core Flood Example | Fluorinated Polymer | Solvent A | Solvent B |
|---|---|---|---|
| 1 | Example 5 (2) | PG (69) | IPA (29) |
| 2 | Example 27 (2) | PG (69) | IPA (29) |
| 3 | Fluorinated Polymer 2 (2) | PG (69) | IPA (29) |
| Comp. Ex. A | A (2) | PG (69) | IPA (29) |
| Comp. Ex. B | B (2) | PG (69) | IPA (29) |
| Comp. Ex. C | none | PG (70) | IPA (30) |

Figure 2:
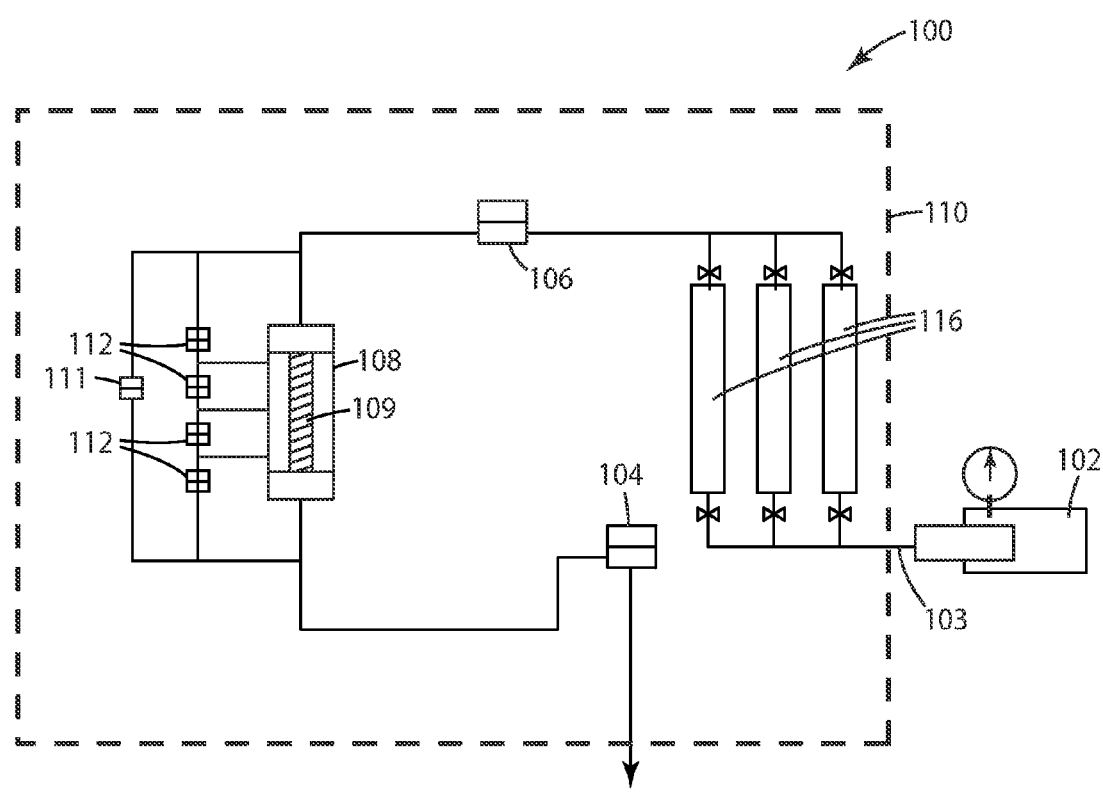
FIG. 2 is a schematic illustration of the core flood set-up used for the Examples.

Core Flood Setup:

A schematic diagram of a core flood apparatus 100 used to determine relative permeability of a substrate sample (i.e., core) is shown in FIG. 2. Core flood apparatus 100 included positive displacement pumps (Model No. 1458; obtained from General Electric Sensing, Billerica, Mass.) 102 to inject fluid 103 at constant rate into fluid accumulators 116. Multiple pressure ports 112 on high-pressure core holder 108 (Hassler-type Model UTPT-1x8-3K-13 obtained from Phoenix, Houston Tex.) were used to measure pressure drop across four sections (2 inches in length each) of core 109. An additional pressure port 111 on core holder 108 was used to measure pressure drop across the entire length (8 inches) of core 109. Two back-pressure regulators (Model No. BPR-50; obtained from Temco, Tulsa, Okla.) 104, 106 were used to control the flowing pressure upstream 106 and downstream 104 of core 109.

The flow of fluid was through a vertical core to avoid gravity segregation of the gas. High-pressure core holder 108, back pressure regulators 106, fluid accumulators 116, and tubing were placed inside a pressure- and temperature-controlled oven 110 (Model DC 1406F; maximum temperature rating of 650° F. (343° C.) obtained from SPX Corporation, Williamsport, Pa.) at 275° F. (135° C.). The maximum flow rate of fluid was 7,000 mL/hr.

Cores:

A core sample was cut from a sandstone block obtained from Cleveland Quarries, Vermillion, Ohio, under the trade designation "BEREA SANDSTONE". One core was used for each of Core Flood Examples 1 to 3 and for each of Comparative Examples A to C. The properties for each of the cores used are shown in Table 6, below.

TABLE 6

| | Ex. 1 | Ex. 2 | Ex. 3 | C. E. A | C. E. B | C. E. C |
|---|---|---|---|---|---|---|
| Diameter, cm | 2.5 | 2.4 | 2.5 | 2.5 | 2.5 | 2.6 |
| Length, cm | 14.6 | 14.6 | 14.8 | 14.6 | 14.6 | 14.6 |
| Pore volume, mL | 13.5 | 13.0 | 13.4 | 13.4 | 13.4 | 15.2 |
| Porosity, % | 18.8 | 19.0 | 19.0 | 19.0 | 19.0 | 19.4 |

The porosity was measured using a gas expansion method. The pore volume is the product of the bulk volume and the porosity.

Synthetic Condensate Composition:

A synthetic gas-condensate fluid containing 93 mole percent methane, 4 mole percent n-butane, 2 mole percent n-decane, and 1 mole percent n-pentadecane was used for the core flooding evaluation. Approximate values for various properties of the fluid are reported Table 7, below.

TABLE 7

| Dewpoint, psig (Pa) | 4200 (2.9 × $10^7$) |
|---|---|
| Core pressure, psig (Pa) | 1500 (1.0 × $10^7$) |

TABLE 7-continued

| | |
|---|---|
| Liquid dropout, V/Vt % | 3.2 |
| Gas viscosity, cP | 0.017 |
| Oil viscosity, cP | 0.22 |
| Interfacial tension, dynes/cm | 5.0 |

Core Flood Procedure:

The cores described in Table 3 were dried for 72 hours in a standard laboratory oven at 95° C., and then were wrapped in aluminum foil and heat shrink tubing (obtained under the trade designation "TEFLON HEAT SHRINK TUBING" from Zeus, Inc., Orangeburg, S.C.). Referring again to FIG. 2, the wrapped core 109 was placed in core holder 108 inside oven 110 at 75° F. (24° C.). An overburden pressure of 3400 psig ($2.3 \times 10^7$ Pa) was applied. The initial single-phase gas permeability was measured using nitrogen at a flowing pressure of 1200 psig ($8.3 \times 10^6$ Pa).

The brine was introduced into the core 109 by the following procedure. The outlet end of the core holder was connected to a vacuum pump and a full vacuum was applied for 30 minutes with the inlet closed. The inlet was connected to a burette with the brine in it. The outlet was closed and the inlet was opened to allow a known volume of brine to flow into the core. For each of Examples 1 to 3 and Comparative Examples A to C, a 26% brine saturation (i.e., 26% of the pore volume of the core was saturated with brine) was established by allowing 5.3 mL of brine to flow into the core before the inlet value was closed. The permeability was measured at the water saturation by flowing nitrogen at 1200 psig and 75° F. (24° C.).

Referring again to FIG. 2, the wrapped core 109 in the core holder 108 was placed inside oven 110 at 275° F. (135° C.) for several hours to allow it to reach reservoir temperature. The synthetic gas-condensate fluid described above was then introduced at a flow rate of about 690 mL/hr until steady state was established. Upstream back-pressure regulator 106 was set at about 4900 psig ($3.38 \times 10^7$ Pa), above the dew point pressure of the fluid, and downstream back-pressure regulator 104 was set at about 1500 psig ($3.38 \times 10^7$ Pa). The gas relative permeability before treatment was then calculated from the steady state pressure drop after about 200 pore volumes were injected. The fluorinated polymer composition, shown in Table 5 (above), was then injected into the core. After at least 20 pore volumes were injected, the fluorinated polymer composition was held in the core at 275° F. (135° C.) for about 15 hours. The synthetic gas condensate fluid described above was then introduced again at a flow rate of about 690 mL/hour using positive displacement pump 102 until a steady state was reached (about 150 to 200 pore volumes). The gas relative permeability after treatment was then calculated from the steady state pressure drop. For Core Flood Example 1 and Comparative Example C, the core was allowed to stand in the presence of the synthetic condensate compositions for 3 and 24 hours, respectively, before a second core flood was run.

Following the relative permeability measurements, methane gas was injected, using positive displacement pump 102, to displace the condensate and measure the final single-phase gas permeability.

For Core Flood Examples 1 to 3 and Comparative Examples A to C, the initial single-phase gas permeability, measured after brine saturation, the brine and brine saturation, the gas relative permeability before treatment with the fluorinated polymer composition, the gas relative permeability after treatment (at the times indicated above), the ratio of the gas relative permeabilities after and before treatment (i.e., improvement factor) are reported in Table 8, below.

TABLE 8

| | Core Flood Example | | | | | |
|---|---|---|---|---|---|---|
| | 1 | 2 | 3 | C. E. A | C. E. B | C. E. C |
| Gas permeability, millidarcy (md) | 199.0 | 103.1 | 84.2 | | 132.2 | 357.5 |
| Gas relative permeability before treatment | 0.069 | 0.057 | 0.064 | 0.068 | 0.064 | 0.069 |
| Gas relative permeability after treatment | 0.126/0.125 | 0.115 | 0.129 | plugged | 0.104 | 0.115/0.099 |
| Improvement factor | 1.83/1.81 | 2.0 | 2.02 | | 1.63 | 1.67/1.43 |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A fluorinated polymer comprising:
first divalent units represented by formula:

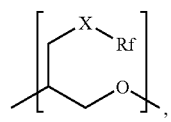

and
a plurality of groups of formula —$CH_2$—$CH_2$—O—,
wherein
each Rf independently represents a fluoroalkyl group having from 1 to 4 carbon atoms;
each X is independently —N(R)$SO_2$—, —N(R)CO—, —O—$C_pH_{2p}$—, or —S—$C_pH_{2p}$—;
p is an integer from 0 to 6; and
R is hydrogen or alkyl having 1 to 6 carbon atoms.

2. The fluorinated polymer according to claim 1, wherein at least a portion of the plurality of groups of formula —$CH_2$—$CH_2$—O— are present in segments represented by formula:

or

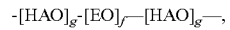

wherein
EO represents —$CH_2CH_2O$—;
each HAO independently represents —CH($CH_3$)$CH_2O$—, —$CH_2$CH($CH_3$)O—, —CH($CH_2CH_3$)$CH_2O$—, —$CH_2$CH($CH_2CH_3$)O—, or —$CH_2$C($CH_3$)$_2$O—;
each f is independently an integer of from 1 to about 250; and
each g is independently an integer of from 0 to about 55.

3. The fluorinated polymer according to claim 1, wherein at least a portion of the plurality of groups of formula —CH$_2$—CH$_2$—O— are present in second divalent units represented by formula:

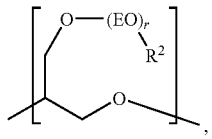

wherein
EO represents —CH$_2$CH$_2$O—;
each r is independently an integer from 1 to about 150; and
each R$^2$ is independently hydrogen or alkyl having 1 to 4 carbon atoms.

4. A composition comprising a fluorinated polymer and solvent, wherein the fluorinated polymer comprises:
first divalent units represented by formula:

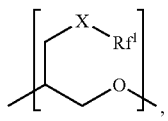

and
a plurality of groups of formula —CH$_2$—CH$_2$—O—, wherein
each X is independently —N(R)SO$_2$—, —N(R)CO—, —O—C$_p$H$_{2p}$—, or —S—C$_p$H$_{2p}$—;
R is hydrogen or alkyl having 1 to 6 carbon atoms;
p is an integer from 0 to 6; and
each Rf$^1$ independently represents a fluoroalkyl group having from 1 to 8 carbon atoms;
and wherein the solvent comprises:
at least one of a polyol or polyol ether, wherein the polyol and polyol ether independently have from 2 to 25 carbon atoms, and
at least one monohydroxy alcohol, ether, or ketone, each independently having up to 4 carbon atoms.

5. The composition according to claim 4, wherein at least a portion of the plurality of groups of formula —CH$_2$—CH$_2$—O— are present in segments represented by formula:

-[EO]$_f$-[HAO]$_g$-[EO]$_f$—; or

-[HAO]$_g$-[EO]$_f$—[HAO]$_g$—, wherein
EO represents —CH$_2$CH$_2$O—;
each HAO independently represents —CH(CH$_3$)CH$_2$O—, —CH$_2$CH(CH$_3$)O—, —CH(CH$_2$CH$_3$)CH$_2$O—, —CH$_2$CH(CH$_2$CH$_3$)O—, or —CH$_2$C(CH$_3$)$_2$O—;
each f is independently an integer of from 1 to about 250; and
each g is independently an integer of from 0 to about 55.

6. The composition according to claim 4, wherein at least a portion of the plurality of groups of formula —CH$_2$—CH$_2$—O— are present in second divalent units represented by formula:

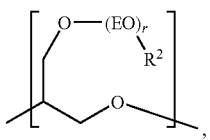

wherein
EO represents —CH$_2$CH$_2$O—;
each r is independently an integer from 1 to about 150; and
each R$^2$ is independently hydrogen or alkyl having 1 to 4 carbon atoms.

7. The composition according to claim 4, wherein Rf$^1$ represents a fluoroalkyl group having from 1 to 4 carbon atoms, wherein X is —N(R)SO$_2$—, and wherein R is methyl or ethyl.

8. The composition according to claim 4, wherein the polyol or polyol ether is at least one of 2-butoxyethanol, ethylene glycol, propylene glycol, poly(propylene glycol), 1,3-propanediol, 1,8-octanediol, diethylene glycol monomethyl ether, or dipropylene glycol monomethyl ether.

9. The composition according to claim 4, wherein a ratio of fluorinated atoms in the first divalent units to oxygen atoms in the plurality of groups of formula —CH$_2$—CH$_2$—O— is up to 5 to 1.

10. A method of treating a hydrocarbon-bearing formation, the method comprising:
contacting the hydrocarbon-bearing formation with a composition, the composition comprising solvent and a fluorinated polymer, the fluorinated polymer comprising:
first divalent units represented by formula:

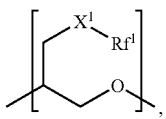

and
a plurality of groups of formula —CH$_2$—CH$_2$—O—, wherein
each X$^1$ is independently —N(R)SO$_2$—, —N(R)CO—, —O—C$_p$H$_{2p}$—, —S—C$_p$H$_{2p}$—, Or —C$_q$H$_{2q}$—;
R is hydrogen or alkyl having 1 to 6 carbon atoms;
p is an integer from 0 to 6;
q is an integer from 0 to 6; and
each Rf$^1$ independently represents a fluoroalkyl group having from 1 to 8 carbon atoms.

11. The method according to claim 10, wherein the hydrocarbon-bearing formation has brine.

12. The method according to claim 10, wherein the hydrocarbon-bearing formation has a temperature, and wherein when the composition is contacting the hydrocarbon-bearing formation, the fluorinated polymer has a cloud point that is above the temperature of the hydrocarbon-bearing formation.

13. The method according to claim 10, wherein the solvent comprises at least one of a polyol or polyol ether independently having from 2 to 25 carbon atoms.

14. The method according to claim 10, wherein the solvent comprises at least one of monohydroxy alcohol, ether, or ketone each independently having up to 4 carbon atoms.

15. The method according to claim 10, wherein the hydrocarbon-bearing formation has at least one fracture, and wherein the fracture has a plurality of proppants therein.

16. The method according to claim 10, wherein $X^1$ is —N(R)SO$_2$—, R is methyl or ethyl, and Rf$^1$ represents a fluoroalkyl group having from 1 to 4 carbon atoms.

17. The method according to claim 10, wherein at least a portion of the plurality of groups of formula —CH$_2$—CH$_2$—O— are present in segments represented by formula:

-[EO]$_f$—[HAO]$_g$-[EO]$_f$—; or

-[HAO]$_g$-[EO]$_f$—[HAO]$_g$—, wherein
EO represents —CH$_2$CH$_2$O—;
each HAO independently represents —CH(CH$_3$)CH$_2$O—, —CH$_2$CH(CH$_3$)O—, —CH(CH$_2$CH$_3$)CH$_2$O—, —CH$_2$CH(CH$_2$CH$_3$)O—, or —CH$_2$C(CH$_3$)$_2$O—;
each f is independently an integer of from 1 to about 150; and
each g is independently an integer of from 0 to about 55.

18. The composition according to claim 10, wherein at least a portion of the plurality of groups of formula —CH$_2$—CH$_2$—O— are present in second divalent units represented by formula:

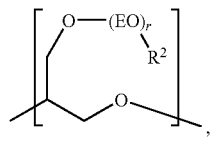

wherein
EO represents —CH$_2$CH$_2$O—;

each r is independently an integer from 1 to about 150; and
each R$^2$ is independently hydrogen or alkyl having 1 to 4 carbon atoms.

19. A hydrocarbon-bearing siliciclastic formation treated with a fluorinated polymer, wherein the fluorinated polymer comprises:
first divalent units represented by formula:

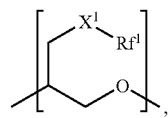

and
a plurality of alkyleneoxy groups having from 2 to 4 carbon atoms,
wherein
each $X^1$ is independently —N(R)SO$_2$—, —N(R)CO—, —O—C$_p$H$_{2p}$—, —S—C$_p$H$_{2p}$—, or —C$_q$H$_{2q}$—;
R is hydrogen or alkyl having 1 to 6 carbon atoms;
p is an integer from 0 to 6;
q is an integer from 0 to 6; and
each Rf$^1$ independently represents a perfluoroalkyl group having from 1 to 8 carbon atoms,
and wherein the fluorinated polymer is adsorbed on the formation.

20. A proppant particle comprising a surface, wherein at least a portion of the surface of the proppant particle is treated with the fluorinated polymer according to claim 1.

* * * * *